(12) United States Patent
Hansen et al.

(10) Patent No.: US 8,122,819 B2
(45) Date of Patent: *Feb. 28, 2012

(54) MACHINE FOR INJECTING LIQUIDS

(75) Inventors: Conly L. Hansen, North Logan, UT (US); Edward D. Watts, North Logan, UT (US)

(73) Assignees: Conly L. Hansen, North Logan, UT (US); Edward D. Watts, North Logan, UT (US)

( * ) Notice: Subject to any disclaimer, the term of this patent is extended or adjusted under 35 U.S.C. 154(b) by 20 days.

This patent is subject to a terminal disclaimer.

(21) Appl. No.: 11/305,942

(22) Filed: Dec. 19, 2005

(65) Prior Publication Data

US 2006/0090655 A1    May 4, 2006

Related U.S. Application Data

(63) Continuation of application No. 10/361,459, filed on Feb. 10, 2003, now Pat. No. 6,976,421, which is a continuation-in-part of application No. 09/899,492, filed on Jul. 3, 2001, now Pat. No. 6,763,760.

(51) Int. Cl.
*A23C 17/00* (2006.01)
*A23L 1/31* (2006.01)

(52) U.S. Cl. ................. 99/487; 99/533; 99/535

(58) Field of Classification Search .............. 99/487, 99/494, 533, 535, 532, 450.7; 452/62, 57, 452/66; 426/281, 323, 574, 641
See application file for complete search history.

(56) References Cited

U.S. PATENT DOCUMENTS

| | | | |
|---|---|---|---|
| 3,016,004 A | 1/1962 | Harper et al. | |
| 3,436,230 A | 4/1969 | Harper et al. | |
| 3,649,299 A | 3/1972 | Sholl | |
| 3,661,072 A | 5/1972 | Allinquant et al. | |
| 3,739,713 A | 6/1973 | Kudale et al. | |
| 3,769,037 A | 10/1973 | Sholl | |
| 3,814,007 A | 6/1974 | Lumby et al. | |
| 3,922,357 A | 11/1975 | Townsend | |
| 5,042,722 A * | 8/1991 | Randall et al. | 239/553.5 |
| 5,053,237 A | 10/1991 | Hendricks et al. | |
| 5,071,666 A | 12/1991 | Handel et al. | |
| 5,176,071 A | 1/1993 | Klaassen | |

(Continued)

OTHER PUBLICATIONS

Lee, JH; Olson, NF and Lund, DB; High Pressure Injection of Fluids into Cheese; Process Biochemistry, Dec. 1978, 14-18.

*Primary Examiner* — Reginald L Alexander

(74) *Attorney, Agent, or Firm* — Reinhart Boerner Van Deuren s.c.

(57) ABSTRACT

A machine for injecting liquids is disclosed including use of at least one air pump in fluid communication with at least one injection head having apertures for nozzles. High-pressure injectate flows from the air pump into the head, preferably through a threadlessly mounted filter located within the injection head. To further minimize contamination, fluid that enters the injection head will not contact any threading present in either the head or the nozzles. An air pressure regulator is included to ensure a steady stream of injectate of a desired pressure is delivered to an injection subject via each injection head and also helping to eliminate hesitation in delivery of the fluid by the air pump. Cleaning of the machine is simplified by moving sensitive components into a sealed enclosure, removing them from a wet working environment.

15 Claims, 13 Drawing Sheets

U.S. PATENT DOCUMENTS

| | | |
|---|---|---|
| 5,200,223 A | 4/1993 | Simonsen |
| 5,366,746 A | 11/1994 | Mendenhall |
| 5,460,842 A | 10/1995 | Morgan |
| 5,470,597 A | 11/1995 | Mendenhall |
| 5,472,725 A | 12/1995 | Mendenhall |
| 6,014,926 A * | 1/2000 | Tanaka et al. .................. 99/487 |
| 6,165,528 A | 12/2000 | Tanaka et al. |
| 6,386,099 B1 * | 5/2002 | Otsuka et al. .................. 99/487 |
| 6,474,571 B2 * | 11/2002 | Schmit et al. ............. 239/553.3 |
| 6,763,760 B2 | 7/2004 | Hansen et al. |
| 6,976,421 B2 | 12/2005 | Hansen et al. |

\* cited by examiner

RECYCLE WITH OZONE TREATMENT

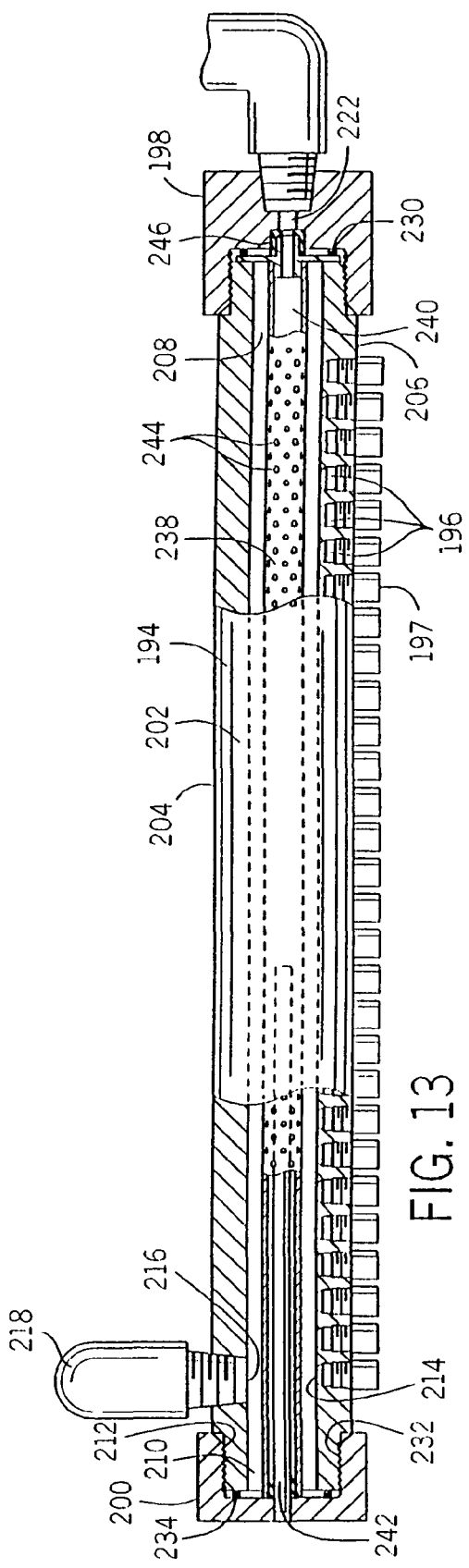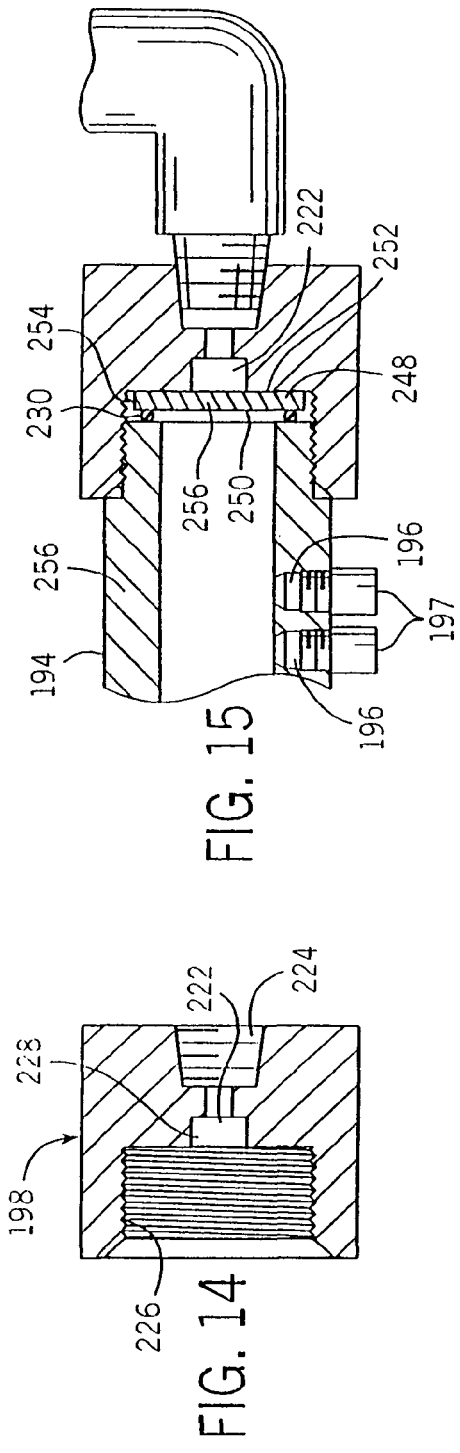
FIG. 13
FIG. 15
FIG. 14

MACHINE FOR INJECTING LIQUIDS

CROSS REFERENCE TO RELATED APPLICATIONS

This application is a continuation of and claims priority benefit from application Ser. No. 10/361,459, filed on Feb. 10, 2003 (now U.S. Pat. No. 6,976,421), which is a continuation-in-part of application Ser. No. 09/899,492, filed on Jul. 3, 2001 (now U.S. Pat. No. 6,763,760), each of which is incorporated herein by reference in its entirety.

BACKGROUND OF THE INVENTION

1. Field of the Invention

This invention relates to a machine for injecting liquids into materials having the consistency of foodstuffs.

2. Description of the Related Art

U.S. Pat. No. 5,053,237 of Deloy G. Hendricks and Conly L. Hansen provides an apparatus for the needleless injection of injectate into meat.

According to lines 33 through 40 in column 4 of that patent, "[A] nozzle injection apparatus causes the injectate to travel from a reservoir under pressure through a valve and out of a nozzle. Sufficient pressure must be provided such that the injectate can travel completely through the cut of meat, if desired. At the same time, temperature controls must be provided so that the injectate leaves the nozzle at a temperature within a desired temperature range."

Lines 41 through 48 of column 6 and lines 3 through 26 of column 7 consistently explain:

"... The injection apparatus 10 will, in most cases, include a temperature control feature, such as a water bath 12, for controlling the temperature of the fluid to be injected ("injectate"). The actual injectate fluid will be contained within reservoir 14 disposed within the confines of water bath 12. It is crucial that the temperature be controlled within certain ranges in order to provide for proper injection.

"The apparatus of the present invention also includes a pump 16 and an adjustable relief valve 18 or pressure control assembly. Thus, the injectate can be pumped in a controlled manner from the reservoir through a nozzle assembly 20.

"Also useful in the present apparatus is an electric solenoid valve 22, which may be placed in communication with an adjustable timer to control duration of the bursts of injectate. Thus, the volume of injectate can be carefully controlled as can the amount of injectate which leaves the system. This apparatus can then be connected to a starter and relay to operate the valve 22.

"The injection apparatus will include a nozzle assembly 20. The nozzle assembly will function to direct the injectate in the proper direction and to maintain the stream of injectate at the proper volume. The nozzle assembly 20 may include a plurality of individual nozzles 24.

"The various components of the apparatus are placed in fluid communication by lines including recycle line 26, a feed line 28, and reservoir line 30.

"Finally, the apparatus illustrated in FIG. 9 includes an injection table 32 to provide support for the meat being injected."

U.S. Pat. No. 6,165,528 of Yoshihiko Tanaka et al. discloses another apparatus for the needleless injection of injectate into meat, which it terms a "pickle injector." This patent asserts, on line 66 of column 9 through line 8 of column 10:

"The pickle injector of the invention is a device for injecting the liquid substance into the green meat. The pickle injector is provided with a high-pressure liquid generator, a liquid-substance injecting section, and a pressure controller which can control the injection pressure while injecting the liquid substance when the liquid substance is injected from the injecting section to the green meat."

"The high-pressure liquid generator in the pickle injector the invention may be any mechanism, as long as it can increase the pressure of the liquid substance to a high level..."

No recognition is given in U.S. Pat. No. 6,165,528 is given to the fact that the injectate will be heated by passing through the pump and the pressure controller; nor is there any discussion concerning reclaiming injectate that does not find its way into the meat.

The apparatus of U.S. Pat. No. 6,165,528 does, however, preferably employ a manifold, as described in line 33 through 60 of column 10:

"... the high-pressure liquid substance is transferred from the high-pressure liquid generator via the high-pressure piping to the injecting section, and it is preferable to use the injecting section which has a member called a manifold for branching a single flow from the high-pressure piping to plural flows. The manifold is preferably placed on the tip end of the injecting section, but can be placed midway in the piping as the case may be.

"The injecting section of the conventional high-pressure liquid generator is of a single-hole type or has a form in which the piping in the manifold is branched radially. The present inventors have manufactured a manifold especially suitable for a pickle injector for meat, piping in the manifold is branched and the branched pipes are parallelly arranged. Here, the parallel arrangement includes not only the arrangement where the pipes are arranged parallel in a row but also the arrangement where the pipes are arranged zigzag or parallel in multiple rows. By arranging nozzles parallel, a nozzle interval can be narrowed to 10 mm or less, e.g., 5.6 mm for injection. Therefore, a highly dense and uniform injection is feasible. Further preferably used is a manifold which has multiple coherent stream injection nozzles arranged parallel in this manner.

"When the manifold is used, the high-pressure liquid substance is injected as the coherent stream from the nozzle on the tip end of each piping. The liquid substance is injected simultaneously from the parallel arranged nozzles to the green meat...."

Subsequently, U.S. Pat. No. 6,165,528 explains, in lines 44 through 47 of column 17, "The liquid substance is injected as a coherent stream from the tip end of the injection nozzle of the manifold 7 in contact with the green meat." Thus, the nozzle actually touches the meat, creating an increased risk of contamination.

In lines 42 through 45 of column 18, similar language describes another embodiment. Also for this other embodiment, however, lines 34 through line 36 of column 18 indicate, "The manifold 7 is ... lowered from above to hit against the green meat."

Although in lines 10 through 11 of column 17 and in line 16 of column 18, U.S. Pat. No. 6,165,528 states that high-pressure piping 6 is "constituted of a flexible hose," no purpose is given for this flexibility. Thus, it is logical to assume that the flexibility is for the traditional purpose in high-pressure lines, viz., absorbing forces associated with the pressure that could damage a more rigid line.

Finally, in its Description of the Related Art, U.S. Pat. No. 6,165,528 provides a summary of needleless injectors and related devices.

To the best of the inventors' knowledge, all previous needleless injectors have utilized pumps, such as positive displacement pumps, which must run continuously in order to maintain the fluid to be used as an injectate under constant high pressure. Heat generated by such continuous operation is transferred to the injectate as it passes through the pump.

Moreover, in the practical implementation of U.S. Pat. No. 5,053,237, once the pressure in the system reached the desired level, a pressure relief valve 18 would prevent the continuously running pump 16 from further raising the pressure. This was accomplished by allowing the injectate to flow from the pump 16, through the pressure relief valve 18, and back to the reservoir 14 that supplied the pump 16 with injectate. A solenoid valve 22 allowed the injectate to flow to the nozzles 24 of the nozzle assembly 20 when desired. The re-circulation of the injectate through the continuously running pump 16 tended to raise the temperature of the injectate even more.

Not only is a cooling system necessary to keep the injectate within the required temperature range, but the added volume in plumbing necessary to provide the recycling and the additional capacity within the reservoir 14 to account for the injectate that is being cooled within the water bath 12 requires a greater quantity of injectate than would otherwise be necessary. This, in turn, mandated the use of a larger pump 16. More energy was required both because of the larger capacity of the pump 16 and because of the continuous operation. And since injectate is purged when it is desired to use another fluid as the injectate, the cost of injectate was higher.

Further, there is an interest in a needleless injection apparatus that can inject a liquid into a subject with minimal damage to the subject itself. There is also an interest in a needleless injection apparatus that can be easily maintained and cleaned in accordance with applicable governmental food safety standards. In addition, there is a need for a needleless injection apparatus that is capable of operation within an existing continuous food preparation/production manufacturing facility without a significant investment in additional equipment and without significant modification of an existing manufacturing process.

Accordingly, reducing exposure of machine components to moisture in the production environment is required to minimize maintenance of the machine. Further, minimizing exposure of the threading on key machine components to the injection fluid or a cleaning solution is required to enhance longevity of the machine and to reduce possible contamination of the injection subjects.

In addition, operation in a continuous environment requires immediate reaction to subtle changes in production process variables. For example, an injection spray that is substantially uniform, without any hesitation during or between injection bursts is required. Accordingly, a method to ensure steady and consistent injection bursts is needed. In addition, the ability to automatically refresh the fluid supply is also desirable.

SUMMARY OF THE INVENTION

The present inventors recognized the preceding disadvantages of the systems in the prior art and developed a needleless injection apparatus that utilizes one or more commercially available air booster pumps. Such a pump generates less heat by operating only when necessary to maintain a desired pressure.

The Machine also employs a head which preferably, but not necessarily, has injectate introduced into the head through apertures in the walls of a hollow tube inside the head that is in fluid communication with the air booster pump. The head has apertures for one or more nozzles. The apertures are preferably, but not necessarily, preferably, but not necessarily, designed so that an input end of the nozzle lies within the head at a point with enough distance to the interior of the wall of the head that any particles within the injectate will tend to fall to a level below the input end of the nozzle and not enter and thereby clog the nozzle.

The head is preferably, but not necessarily, designed so that upon installation one point of the inside of the head will be at substantially the highest elevation. Near such point the head has an escape aperture so that any gas within the injectate that enters the head will tend to flow to and through such escape aperture. Furthermore, a return line preferably, but not necessarily, takes injectate that flows through the escape aperture to the low-pressure side of the air booster pump. And also, a drain, in a work surface to which the head is preferably, but not necessarily, mounted, preferably, but not necessarily, reclaims injectate and transports it to the low-pressure side of the air booster pump.

In order to improve performance of the Machine and minimize outgassing from the injectate, either the source of the injectate is pressurized or a pump is inserted between the source and the air booster pump.

Preferably, but not necessarily, a main injectate filter is located between the source of the injectate and the air booster pump; and, preferably, but not necessarily, the design of the Machine permits this main injectate filter can be replaced while the Machine is operating.

A cleaning aperture is preferably, but not necessarily, located in each end of the head.

A conveyor belt is preferably, but not necessarily, in a work surface to which the head or heads are, preferably, but not necessarily, mounted and has an endless belt containing so that the head or heads can be mounted either above or below the conveyor belt. The conveyor belt is preferably, but not necessarily, one which may operate at different speeds.

Ozone may be added by the Machine to the injectate or applied to the subject of the injection.

And a computer device preferably, but not necessarily, controls many of the components and functions of the Machine.

Further, it may be seen that an improved machine for injecting liquids includes least one injection head movably mounted to an enclosure, with each injection head having an escape aperture, a plurality of injection apertures and nozzles attached thereto. End caps are installed on to each injection head in such a manner that prevents the injection fluid from contacting any threading present in the injection head, which simplifies cleaning of the machine and reduces the possibility of injection fluid contamination.

In addition, stand-alone, easily removable filters are provided within the injection heads over the feed entry ports to remove particulate matter from the injection fluid and to increase the turbulence of the entering fluid. These filters also are positioned within the injection head so as to prevent the injection fluid from contacting any threading present in the injection head.

Further, fast acting solenoid valves are attached to the escape apertures for quickly and automatically releasing any air build-up located within the injection heads. The solenoid valves are located within the enclosure and away from the wet working production environment, thereby improving the ability to clean the machine during production downtime.

In addition, the air pumps are mounted within the enclosure and provide the high-pressure liquid to the injection heads. A controllable, high-pressure regulator is used to automatically adjust the output pressure of the air pumps thereby ensuring that the injection spray is substantially uniform and the air pumps function without any hesitation during or between injection bursts.

Further, the injection fluid coming out of the high-pressure air pumps is first directed to an injection manifold system which includes a number of high-pressure solenoid valves. The manifold system further ensures the fluid and going to each manifold head during an injection burst is substantially similar in pressure and volume.

It may therefore be seen that the present invention teaches both a machine for needleless injection of liquids into a subject, and a method of injecting subjects using high-pressure injection bursts that do not contact the injection subjects. Further, the machine for injecting liquids of the present invention provides for improved injection of subjects by reducing the risk of contamination of the injection subject and simplifying cleaning of the machine. Further, automatic control of the machine by an operator and easy integration into a production facility are also features of the improved machine for injecting liquids of the present invention.

The machine for injecting liquids of the present invention is of a construction which is both durable and long lasting, and which will require little or no repair to be provided by the user throughout its useful lifetime. The machine of the present invention is also of relatively inexpensive construction to enhance its market appeal and to thereby afford it the broadest possible market. Finally, all of the aforesaid advantages and objectives of the machine for injecting liquids of the present invention are achieved without incurring any substantial relative disadvantage.

BRIEF DESCRIPTION OF THE DRAWINGS

FIG. 13 is a cross-sectional view of an injection head of the needleless injection apparatus shown in FIGS. 8 through 12, showing a tubular filter disposed therein;

FIG. 14 is a vertical section of a fluid-in end cap of the injection apparatus shown in FIGS. 8 through 13;

FIG. 15 is a partial cross-sectional view of an injection head of the injection apparatus shown in FIGS. 8 through 13, showing a disk filter disposed therein.

DESCRIPTION OF THE PREFERRED EMBODIMENT

Figure 1:
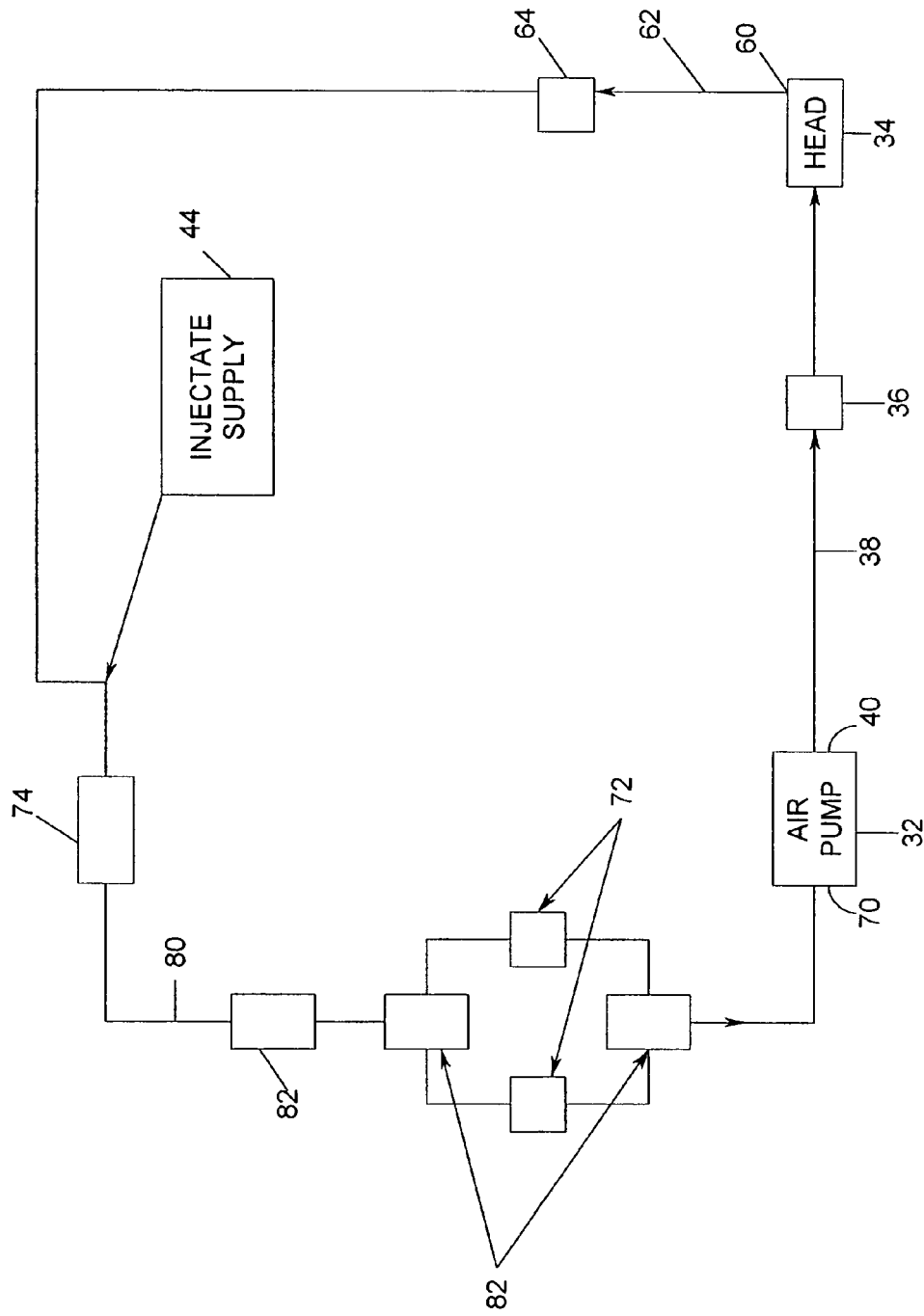
FIG. 1 represents in schematic form the Machine for Injecting Liquids in an embodiment with no reservoir and no recycling of injectate.
Figure 2:
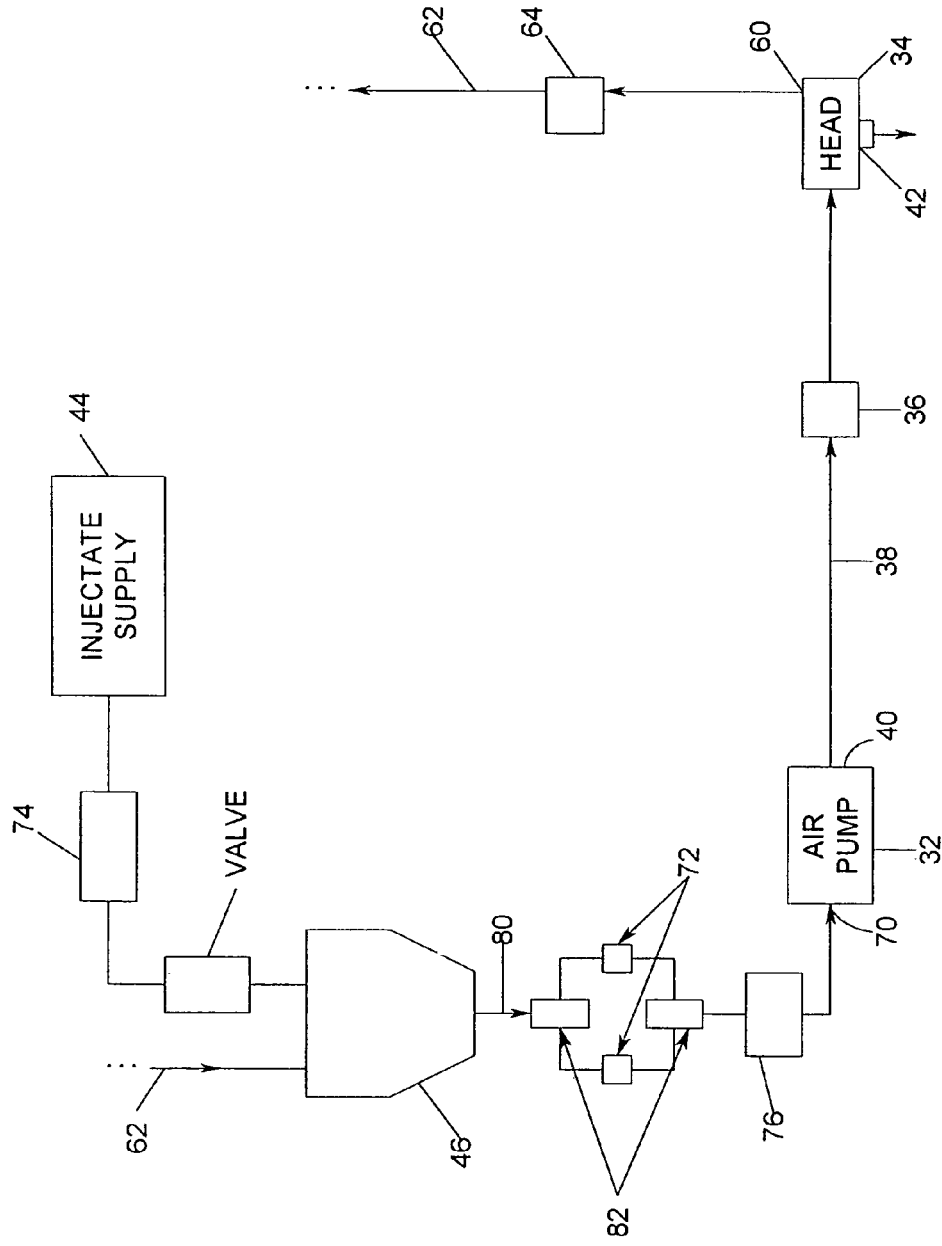
FIG. 2 represents in schematic form the Machine for Injecting Liquids in an embodiment with one reservoir but no recycling of injectate.
Figure 3:
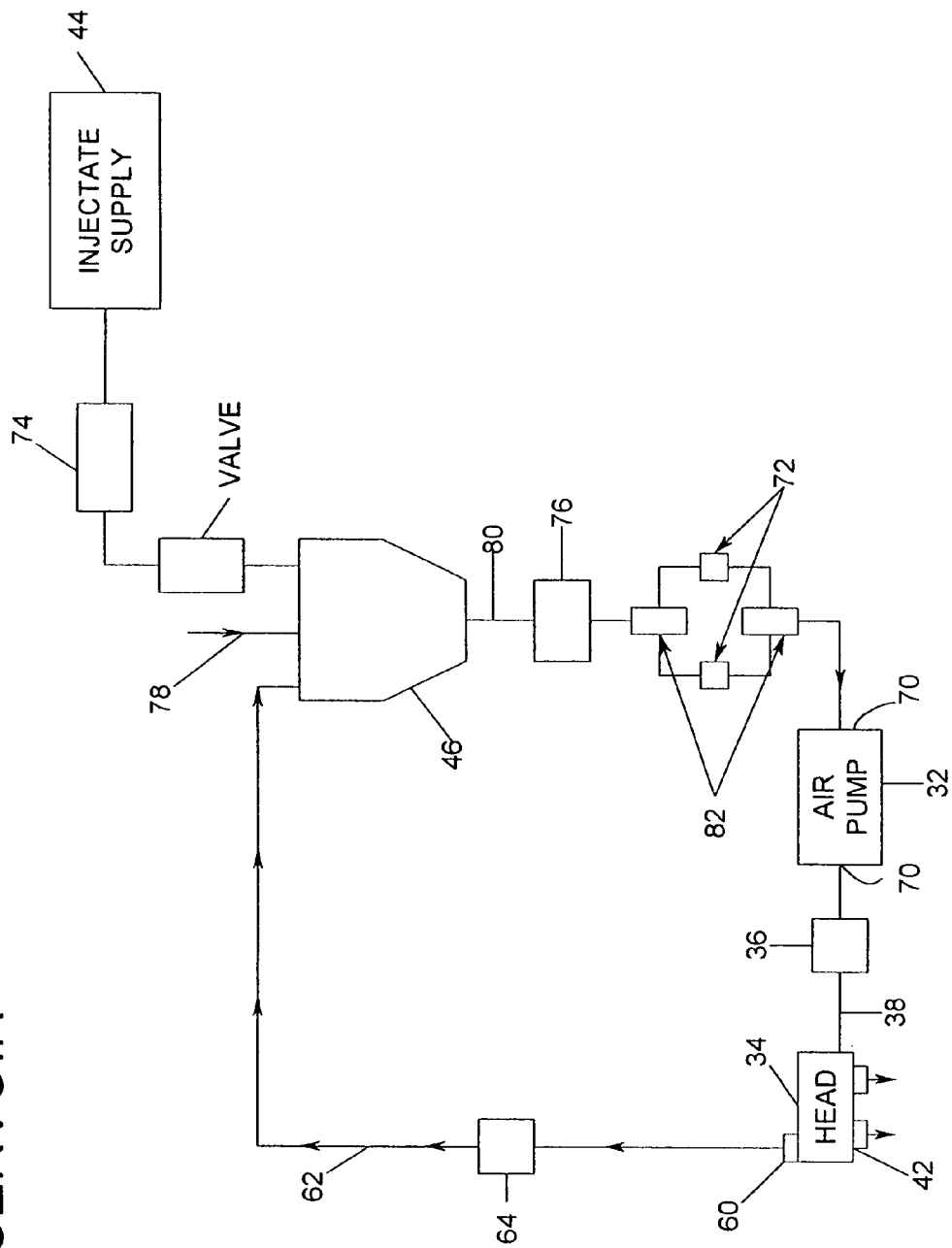
FIG. 3 represents in schematic form the Machine for Injecting Liquids in an embodiment with one reservoir and recycling of injectate.
Figure 4:
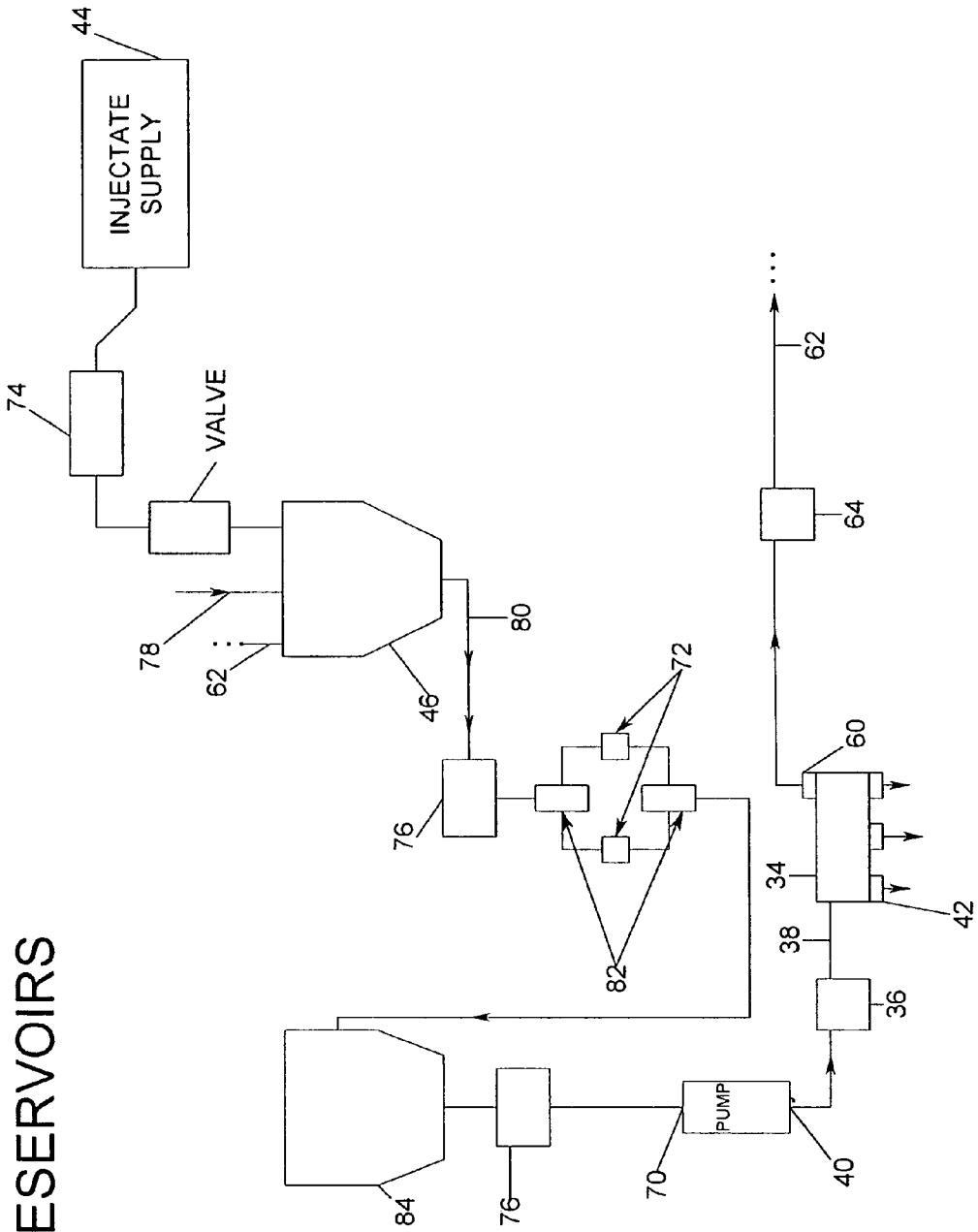
FIG. 4 represents in schematic form the Machine for Injecting Liquids in an embodiment with two reservoirs and recycling of injectate.
Figure 5:
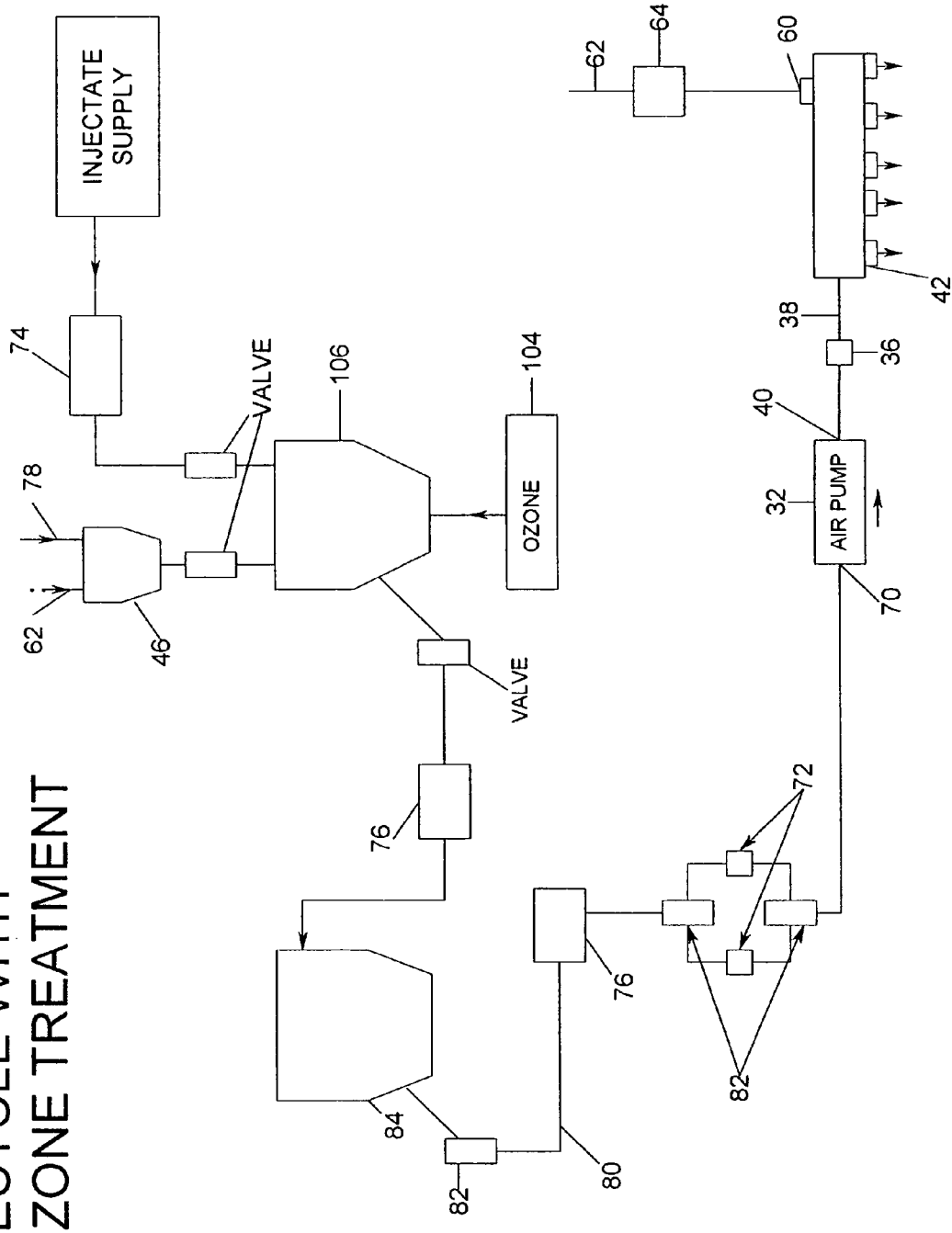
FIG. 5 represents in schematic form the Machine for Injecting Liquids in an embodiment with the capability of adding ozone to the injectate.
Figure 6:
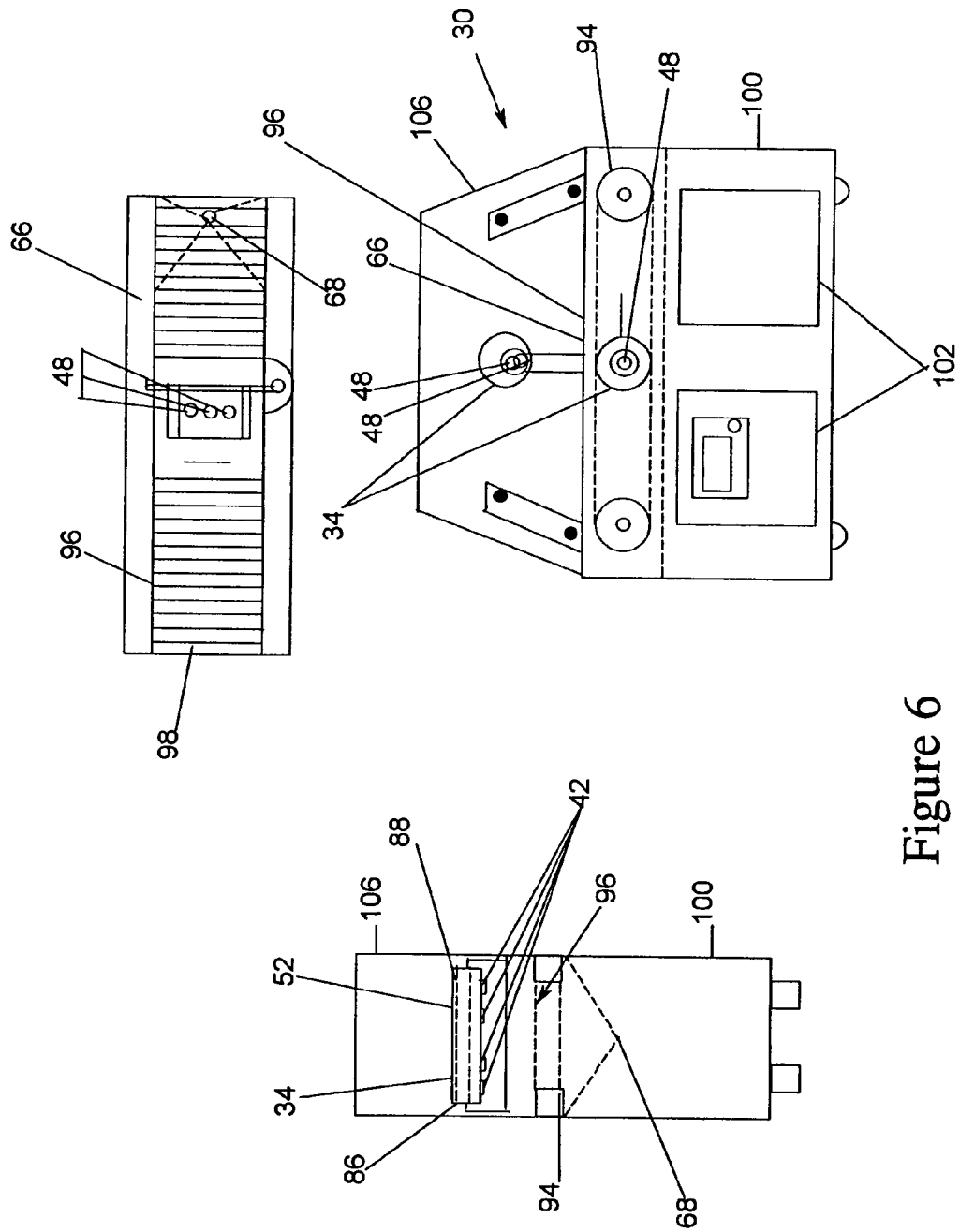
FIG. 6 shows the exterior of the Machine for Injecting Liquids in an embodiment having a drain.
Figure 7:
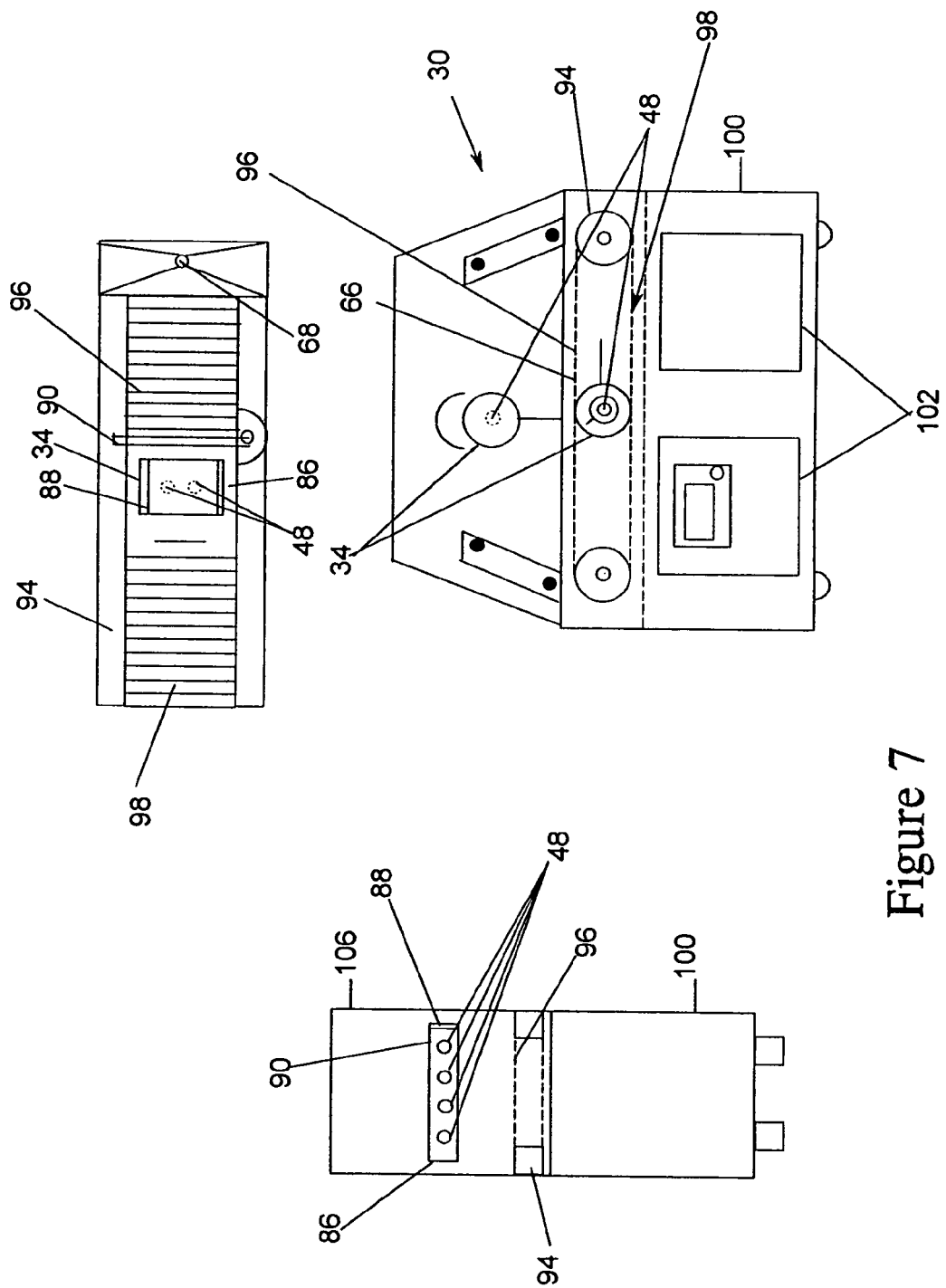
FIG. 7 illustrates the exterior of the Machine for Injecting Liquids in an embodiment having a catch basin in conjunction with the drain.

FIGS. 1 through 8 illustrate several embodiments of a needleless injection systems constructed in accordance with the present invention. Accordingly, the present invention is a needleless injection apparatus 30 that utilizes one or more commercially available air booster pumps 32 which employs relatively low-pressure compressed air typically less than 150 psi) to generate an output pressure sufficiently intense to propel injectate efficiently and without imparting any substantial heat to the injectate. Rather than operating continuously to maintain a desired pressure, the air booster pump 32 stops once that pressure has been attained. Each air booster pump 32 is connected to one or more heads 34. And preferably, but not necessarily, control valve 36 in a feed line 38 going from the high-pressure side 40 of the air booster pump 32 to one or more heads 34 opens to allow injectate on the high-pressure side 40 of the air booster pump 32 to flow through the nozzle or nozzles 42 of the one or more heads 34. When this occurs, the pressure is lowered, and the air booster pump 32 operates only long enough to re-establish the desired pressure.

Preferably, but not necessarily, the control valve 36 is capable of directing injectate from the air booster pump 32 to the specific head or heads 34 which a user wishes to provide injection; alternately, however, a separate valve is located between the air booster pump 32 and each head 34 supplied with injectate by that air booster pump 32 so that a user may determine which heads 34 will be used for injection.

Alternatively, in lieu of either the control valve 36 or the separate valve between the air booster pump 32 and each head 34 supplied with injectate by that air booster pump 32, a separate pilot valve activates, deactivates, and controls the pressure provided by a given air booster pump 32.

The air booster pump 32 holds only a small quantity of injectate and preferably, but not necessarily, receives such injectate from a nearby supply reservoir 46, minimizing the total quantity of injectate that must be within the machine.

Each head 34, itself, has a number of unique features.

The head 34 is a hollow body having apertures 48 near the bottom into which one or more nozzles 42 may be releasably connected. Each nozzle 42 has an input end and an output end. Preferably, but not necessarily, the input end lies within the head 34 at a point with enough distance to the interior of the wall of the head 34 that any particles that may be within the injectate will tend to fall to a level below the input end of the nozzle 42 and, therefore, be unlikely to enter and clog the nozzle 42.

The interior diameter of the nozzles 42 is preferably, but not necessarily, selected to be such that surface tension of a liquid injectate will preclude the injectate from passing through a nozzle 42 unless the air booster pump 32 has pressurized the injectate above atmospheric pressure. This diameter is preferably less than 0.025 inch.

Within the head 34 is, preferably, but not necessarily, located a hollow tube 52 which communicates with the feed line 38 from the air booster pump 32 so that any injectate entering the head 34 must do so through the tube 52. Multiple apertures exist in the wall of the tube 52 that is perpendicular to the longitudinal access of the tube 52; preferably there is an aperture in the vicinity of each nozzle 42 in order to tend to equalize the pressure of the injectate at each nozzle 42. Introduction of the injectate into a head 34 at multiple locations, rather than from a single location, tends to increase turbulence within the injectate inside the head 34 and, therefore, to minimize the tendency of any particles within the injectate to accumulate and block a nozzle 42.

Again preferably, but not necessarily, a filter is located between the feed line 38 and any nozzle 42 associated with that head 34. When the hollow tube 52 is employed, such hollow tube 52 communicates with such aperture; and the hollow tube 52, preferably, but not necessarily, has, as the filter, a screen which removably surrounds the wall of the hollow tube 52 that is parallel to the longitudinal access of the hollow tube 52.

The head 34 is preferably, but not necessarily, designed so that upon installation one point of the inside of the head 34 will be at substantially the highest elevation. Near such point the head 34 has an escape aperture 60 so that any gas within the injectate that enters the head 34 will tend to flow to and through such escape aperture 60. Removal of gas from the injectate within the head 34 is important because, although liquid injectate is essentially incompressible, gas can be compressed; so, when the air booster pump 32 stops, injectate would not be forced through any nozzle 42 by the air booster pump 32 but would be by any entrapped, expanding compressed gas.

A return line 62 is preferably, but not necessarily, attached to the escape aperture 60 in order to return any liquid injectate that is forced through the escape aperture 60 by entrapped, compressed gas to the reservoir 46.

Preferably, but not necessarily, the feed line 38 and the return line 62 are flexible in order to facilitate moving the head or heads to alternate locations. The feed line 38 and the return line 62 could, however, be inflexible.

Preferably, but not necessarily, a valve 64 is located in the escape aperture 60 (or the return line 62). This valve 64 may be a manually operated valve but is preferably an electronically actuated valve.

Each head 34 is preferably, but not necessarily, mounted to a surface termed the "work surface," 66 which is preferably, but not necessarily, the top of a cabinet. Preferably, but not necessarily, the mounting is such that the head 34 may be rotated about one or more axes and preferably about three orthogonal axes. This is accomplished through any means that is well known in the art, such as by securing the head with a clamp that can be opened and then closed or loosened and then tightened. Additionally, it is preferable to have the height of the head above the work surface 66 adjustable. Again, this is accomplished through any means that is well known in the art, such as mounting the clamps on a bracket that can be raised or lowered, e.g., with a hydraulic cylinder or a rotatable screw.

When there are multiple, independently orientable heads 34, a variety of optional techniques for injection exist. For example, injection can occur from multiple directions simultaneously or in timed succession; the angle of entry for the injection from one or more heads 34 can be changed simultaneously or in timed succession; offsetting forces of two or more injection heads 34 can be utilized to stabilize the position of the subject of the injection, precluding or minimizing the movement of the subject that can be caused when injection occurs from a single direction; and the pattern of injection produced by the nozzles 42 of different heads 34 can be overlapped to achieve a higher injection density at one time than could be obtained by using just one head 34, because of physical limitations dictating the space required between adjacent nozzles 42.

The top of the work surface 66, which, as noted above, is preferably, but not necessarily, the top of a cabinet, is preferably, but not necessarily, sloped to collect excess injectate and use gravity to cause it to flow through a drain 68 and preferably, but not necessarily, a screen. The screen can be upstream from the drain 68 or within the drain 68. Optionally, instead of just relying upon gravity, a reclamation pump could be placed in or adjacent to, and in fluid communication with, the drain 68. And the drain 68 optionally could include a catch basin into which injectate reclaimed from the work surface 66 would first flow.

There exist a variety of options for providing injectate to the air booster pump 32. Of course, a source 44 of injectate is connected to and in fluid communication with the input side 70 of the air booster pump 32.

Preferably, but not necessarily, a filter 72 designated the main injectate filter is located between the source of injectate 44 and the air booster pump 32, especially if pre-filtered injectate is not used.

If it is not desired to have a return line 62 from the head 34 and if it is not desired to reclaim injectate from the work surface 66, either a container in which the injectate is delivered or a reservoir 46 into which the injectate is placed can serve as the source 44 of injectate. Gravity can cause the injectate to flow from the source to the air booster pump 32. Preferably, but not necessarily, however, either the source is pressurized, by any means 74 that is well known in the art, with gas to cause the injectate to flow or a pump 76 is inserted between the source and the air booster pump 32. This improves performance of the Machine for Injecting Liquids 30 and tends to preclude outgassing from the injectate which is caused when the air booster pump 32, in the absence of a pressurized source 74 or a pump 76 between the source and the air booster pump 32, creates a vacuum on its low-pressure side 70.

When a pump 76 is inserted between the source and the air booster pump 32 and when there is a return line 62 or a drain 68 from the work surface 66 or both the return line 62 and the drain 68, it is preferable, but not necessary, to have the return line 62 and the drain 68 flow into the container or the reservoir 46, whichever serves as the source 44. In this case, were the source pressurized, check valves could be employed in the return line 62 and the drain line 78, in any manner that is well known in the art; but the reclamation pump would have to provide flow from the drain line 78. And, as a further alternative when the reclamation pump stimulates flow from the drain line 78, a line from the source could combine with the return line 62 and the drain line 78 utilizing check valves in any manner that is well known in the art with the combined line proceeding to the pump 76 between the source and the air booster 32 if such a pump 76 is employed and otherwise going to the low-pressure side 70 of the air booster pump 32.

It is further preferable, but not necessary, to have the ability to remove the main injectate filter 72 while the Machine 30 is still operating. This would permit the main injectate filter 72 to be cleaned or replaced without interfering with production.

One example of a structure for accomplishing this is to have a line 80 from the source that branches into two parallel lines, each having a main injectate filter 72. A valve at the point of branching or on-off valves 82 in each parallel line prior to the main injectate filter 72 select which parallel line will operate. The parallel lines could rejoin prior to or upon entering any pump. An alternate exemplary structure has an auxiliary reservoir 84 located downstream from the main injectate filter 72 prior to any pump. This permits the main injectate filter 72 to be removed when there is no injectate in the first reservoir 46 while sufficient injectate remains in the second reservoir 84 to supply the needs of the Machine 30 at least for the time that is required to replace the main injectate filter 72.

Each head 34, preferably, but not necessarily, has a first end 86 and a second end 88 as well as an aperture 90 designated the "cleaning aperture," which is preferably, but not necessarily, located in either the first end 86 or the second end 88 of the head 34 or, most preferably, both ends 86 and 88 of the head 34. As its name implies, the cleaning aperture 90 facilitates cleaning of the head 34. A brush, a high-pressure flush, or a spray may be introduced to the inside of the head 34 through the cleaning aperture 90. The cleaning aperture 90 is closed preferably, but not necessarily, with a valve located within the cleaning aperture 90. Optionally, a cap designated the "end cap" is removably attached to the head 34 over the cleaning aperture 90. This may be done in any manner that is well known in the art, such as by having mating threads in the cleaning aperture 90 and on the end cap.

Within or adjacent to the top of the work surface 66 is, preferably, but not necessarily, located an endless-belt conveyor 94. The conveyor 94 moves subjects near the head or heads 34 so that such subjects can be injected. Preferably, but not necessarily, the belt 96 of the conveyor contains apertures 98 so that a head or heads 34 can even be mounted below the belt 96 as well as above or substantially even with the belt 96.

Preferably, but not necessarily, the speed of the conveyor 94 is variable; movement of the conveyor 94 can be continuous or incremental; and preferably the conveyor 94 employs electronic braking to insure that the conveyor 94 is stopped rapidly and completely when desired.

Although the Machine 30 can be operated manually, it preferably, but not necessarily, includes a computer device such as a programmable logic controller.

The computer device, thus, preferably utilizes programmable microprocessors and includes the traditional features of a computer, such as a memory.

The length of the injection burst, injection pressure, and the delay between bursts can be programmed into the computer device by a user, although optional default settings can be placed into the computer device at the factory. The computer device is preferably, but not necessarily, capable of storing multiple programs that can be used when desired. Preferably, but not necessarily, the length of the injection burst can be varied from no injection to a continuous injection.

The computer device, furthermore, is preferably, but not necessarily, capable of controlling the movement of the conveyor 94 and synchronizing such movement with the injection burst in order to select the desired effect of the injection. For example, the computer device can, preferably, but not necessarily, cause injection to occur only when the conveyor 94 is stopped and thereby create virtually unnoticeable points of entry for the injectate into the subject; or, alternatively, the computer device can cause injection to transpire while the conveyor 94 is moving to create a slit in the subject that will result in mechanical tenderizing when the subject is material such as meat.

Optionally, the computer device may also be interfaced with various sensors, such as a sensor that detects the thickness of the subject. A program in the computer device then adjusts one or more injection parameters to accomplish a pre-selected goal with regard to the subject, e.g., attainment of a selected concentration of injectate within the subject.

Additionally, all valves in the Machine, including but not limited to, the valve in the cleaning aperture 90 and the valve in the escape aperture 60 can preferably, but not necessarily, be controlled by the computer device. When this is done for the valve in the escape aperture 60, the computer device is preferably, but not necessarily, programmed to open the valve in the escape aperture 60 for a specified duration after a specified number of injections. Experience with the Machine 30 will enable a user successfully to predict the rate of accumulation of gas and, therefore, the number of injections after which the valve in the escape aperture 60 should be opened as well as the duration for such opening, although again default settings can be placed into the computer at the factory. Alternatively, the computer device can be programmed with algorithms based upon formulae that are well known in the art to calculate the theoretical pressure anywhere on the high-pressure side 40 of the air booster pump 32, e.g., in the feed line 38. A pressure sensor then measures the actual pressure. The computer device is programmed to compare the actual and theoretical pressures. Since air within the portions of the Machine 30 that are in fluid communication on the high-pressure side 40 of the air booster pump 32 is generally responsible for the actual pressure being lower than the theoretical pressure, the computer device is programmed with a range below the theoretical pressure within which the actual pressure must be. The computer device is further programmed to actuate, i.e., open, the valve in the escape aperture 60 one or more times until the actual pressure has risen so that it is above the lower limit of the acceptable pressure range. And in a still further option when the electronically actuated valve is employed in the escape aperture 60, a sensor is located in the head 34 near or, preferably, in the escape aperture 60. This sensor may be any sensor that is capable of distinguishing between liquid and gas, such as an optical sensor or a pressure sensor. The sensor is connected to the electronically actuated valve and causes the electronically actuated valve to be in the open position whenever gas is detected by the sensor.

Also, when there are multiple heads 34, some or all of the parameters can, preferably, but not necessarily, be varied independently for each head 34. This may be done with or without a computer device, but it is more practical to employ a computer device for such purpose.

Preferably, but not necessarily, input by the user to the computer device is accomplished with a sealed touch panel because this can withstand a wet environment. Any other input device that can withstand a moist environment is also acceptable. And any input device known in the art could be used if kept a sufficient distance from the moist environment associated with the Machine.

Preferably, but not necessarily, the mounting of each head 34 is accomplished with gears and motors that are well known in the art so that each head 34 is moved in three axes as well as raised and lowered using the motors and gears. Such motors and gears are preferably, but not necessarily sealed as are their connections to power, using any technique that is well known in the art, so that they will not be impaired by a moist environment. Also preferably, but not necessarily, using any technique that is well known in the art, such as wires, radio frequency communication, or infrared communication, such motors and gears are remotely controllable. As is well known in the art, this can be done directly through the input device, preferably, but not necessarily, a touch panel or through an input device and the computer.

All features of the Machine 30 except the work surface 66, the heads 34, the motors and gears, and the lines are preferably, but not necessarily, contained within a sealed cabinet 100. Moreover as discussed above, the work surface 66 is preferably, but not necessarily, the top of a cabinet; and, in the preferred embodiment, this would be the sealed cabinet 100.

Anything which enters the sealed cabinet 100, e.g., wires or lines, such as a line to fill an non-pressurized reservoir, preferably, but not necessarily, enter through apertures which are sealed, preferably, but not necessarily, with rubber gaskets. For maintenance, one or more doors 102 preferably, but not necessarily, exist in the outer surface of the cabinet 100; but these doors 102 and the sealed cabinet 100 incorporate a seal, preferably, but not necessarily one or more gaskets, around the opening or openings formed when the door 102 is not closed.

Optionally, in order to minimize the presence of microorganisms in the injectate, a source of ozone 104 is connected to a non-pressurized reservoir in any manner that is well known in the art. The ozone 104 is then allowed to bubble through the injectate in such reservoir. This may, for example, be accomplished by connecting the source of ozone 104 through a pressure regulator and valve to the reservoir near the bottom of such reservoir. And, as indicated above, this valve and, indeed, every valve associated with the Machine 30 are, preferably, but not necessarily controlled by the computer device.

Because the introduction of ozone 104 is somewhat consumptive of time, it is preferable, but not necessary, to have a non-pressurized reservoir in each of two parallel lines and to have one or more valves control which reservoir is receiving ozone and which is being used to supply injectate. This is done in a similar fashion as discussed above for the use of two main injectate filters.

Also, as discussed with respect to the main injectate filter, the two reservoirs could be in series with the upstream reservoir being used for introduction of ozone 104 into the injectate while the downstream reservoir supplies the operational needs of the Machine for injectate.

Similarly, the subject of injection is preferably, but not necessarily, treated with ozone 104 prior to injection. In the same manner as described above for the injectate, ozone 104 is bubbled through a water reservoir containing water. Then there are three options. The subject can be passed through the water reservoir, the water containing ozone can be transferred by any method that is well known in the art to a holding reservoir through which the subject is passed, or the water containing ozone can be sprayed on the subject by any method that is well known in the art.

Preferably, but not necessarily, any portion of the Machine 30 that will contact either the subject or the injectate must meet the food grade specifications that are well known in the art.

Also preferably, but not necessarily, a removable safety shield 106 covers the working surface 66 and heads 34 to such an extent that a user cannot touch the nozzles 42 or the stream of injectate.

Preferably, but not necessarily, this safety shield 106 is transparent. And preferably, but not necessarily, sensors or interlocks, in any manner that is well known in the art, determine when the safety shield 106 has been installed and preclude the Machine 30 from injecting whenever the safety shield 106 has not been installed.

It can be seen that the above-described needleless injection apparatus can take several preferred forms, depending on the application of use for the machine. However, in food manufacture or production facilities, there is an interest in a needleless injection apparatus and method for using that can be incorporated into a continuous production line. In addition, the needleless injection apparatus of the present invention must also incorporate features that permit the machine to be easily operated, maintained and cleaned within a continuous production environment. Further, the improved needleless injection apparatus of the present invention minimizes down time for cleaning between runs and reduces potential contamination of the injection subjects by eliminating exposure of the injection fluid to threaded connection points within the manifold head.

Figure 8:
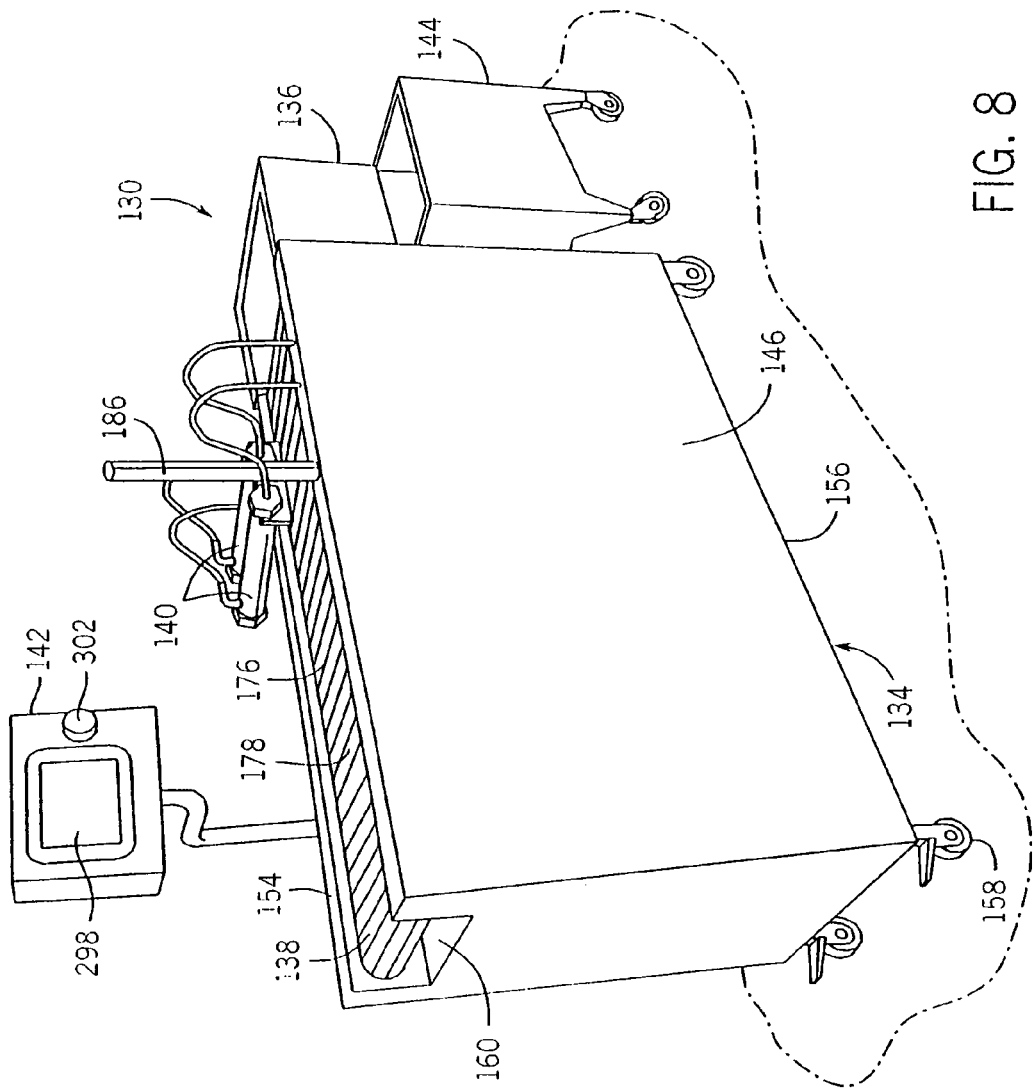
FIG. 8 is an isometric view of the injection apparatus of the present invention, showing a front side thereof.

In light of the foregoing, FIGS. 8 through 16 illustrate a further embodiment of a needleless injection apparatus 130 of the present invention. FIG. 8 illustrates a front side of the needleless injection apparatus 130 which includes a cabinet 134, a large catch basin 136, an endless-belt conveyor system 138, injection heads 140 and a control panel 142. Further, the apparatus includes a primary fluid reservoir 144 that is removably connected to the cabinet 134. It will be understood that the needleless injection apparatus 130 of the present invention can further include a safety shield attached to the cabinet 134 for protecting an operator from contacting the moving components or the injection spray while the apparatus is operating.

Figure 9:
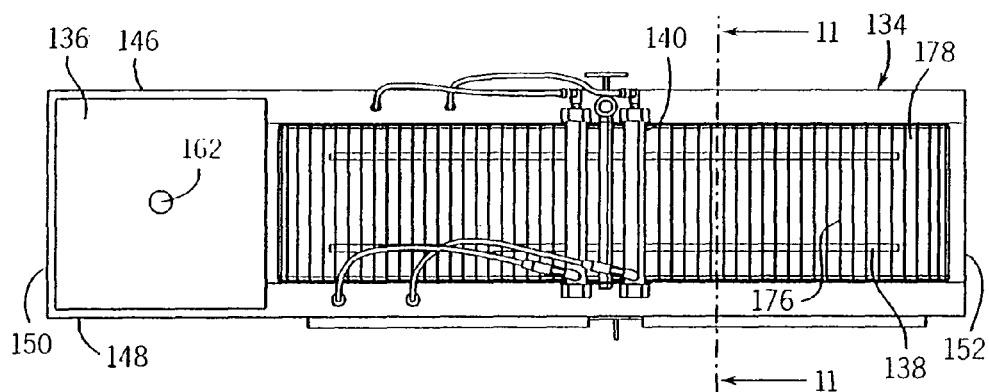
FIG. 9 is top plan view of the injection apparatus shown in FIG. 8.

As shown in FIGS. 8 and 9, the cabinet 134 is of a generally box-like construction and includes a front 146, a back 148, a right end 150, a left end 152, a top 154 and a bottom 156. Further, the cabinet 134 can include casters 158. The cabinet 134 also contains a channel 160 formed integrally in the top 154 for capturing and directing excess fluid to the catch basin 136. The catch basin 136 is integral with the cabinet 134 and extends outward from the right end 150 of the cabinet 134 to collect excess injection fluid.

The catch basin 136 contains a drain 162 which releases the collected injection fluid directly back into the primary reservoir 144, or alternatively, to a drain line which is piped directly to a floor drain. Also, the catch basin 136 can instead be removably attached to the right end 150 of the cabinet 134 in any manner known to those skilled in the art that prevents any excess injectate from spilling onto unwanted surfaces or equipment.

Figure 10:
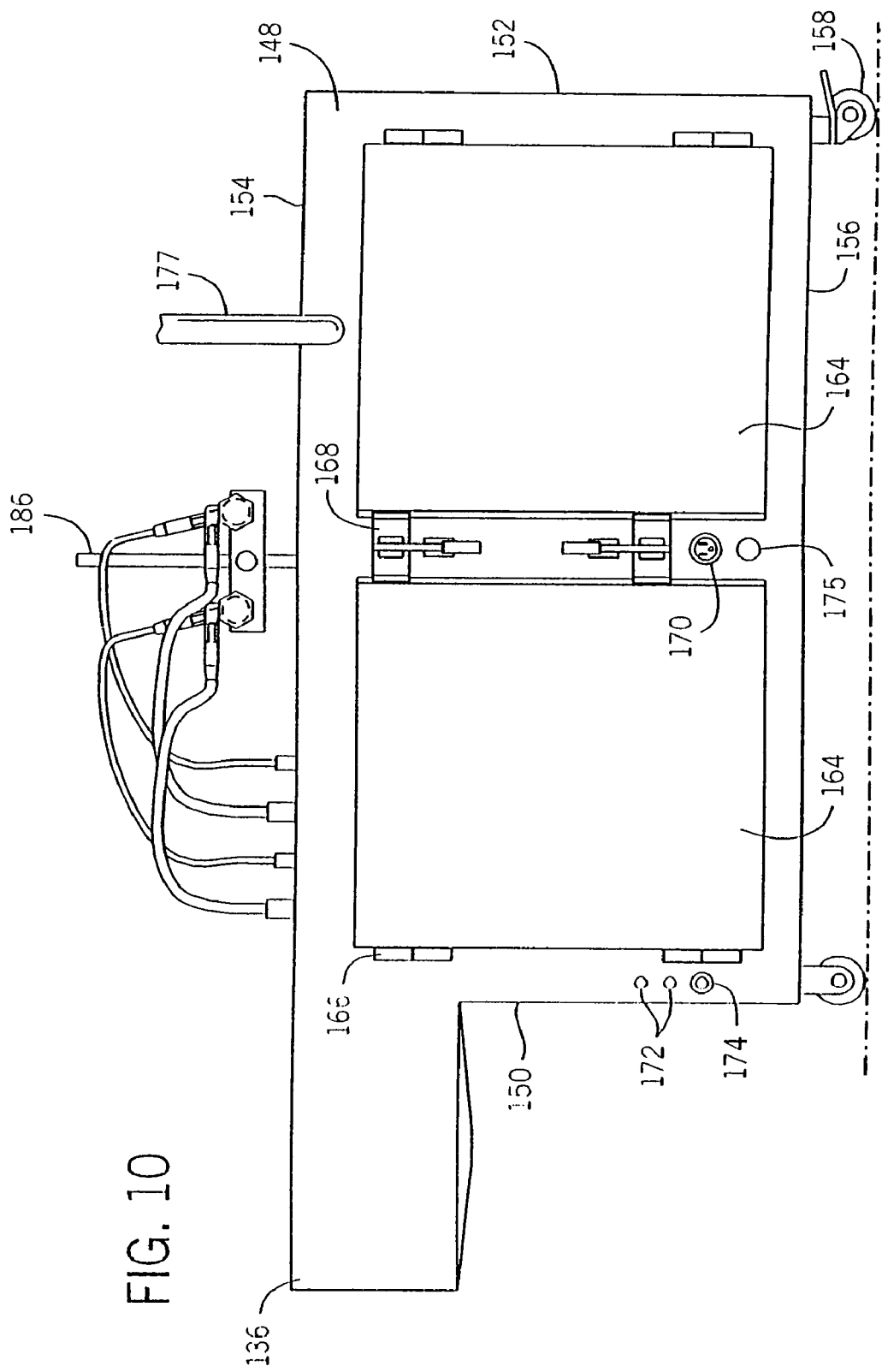
FIG. 10 a plan view of the injection apparatus shown in FIGS. 8 and 9, showing a back side of the cabinet.

Turning for the moment to FIG. 10, the back side of the injection apparatus 130 is shown. The back 148 of the cabinet 134 contains large doors 164, door hinges 166, a door sealing and locking mechanism 168, a main power inlet 170, multiple quick-connect air outlet ports 172 for powering external air actuated pumps or valves, and a feed inlet port 174 through which fluid pumped from the primary fluid reservoir 144 to the injection heads 140 must travel. The back 148 of the cabinet 134 further includes a compressed air inlet port 175 for supplying compressed air to the cabinet 134. Further, it can be seen that the control panel 142 is mounted to the back 148 of the cabinet 134 with mounting post 177.

Figure 11:
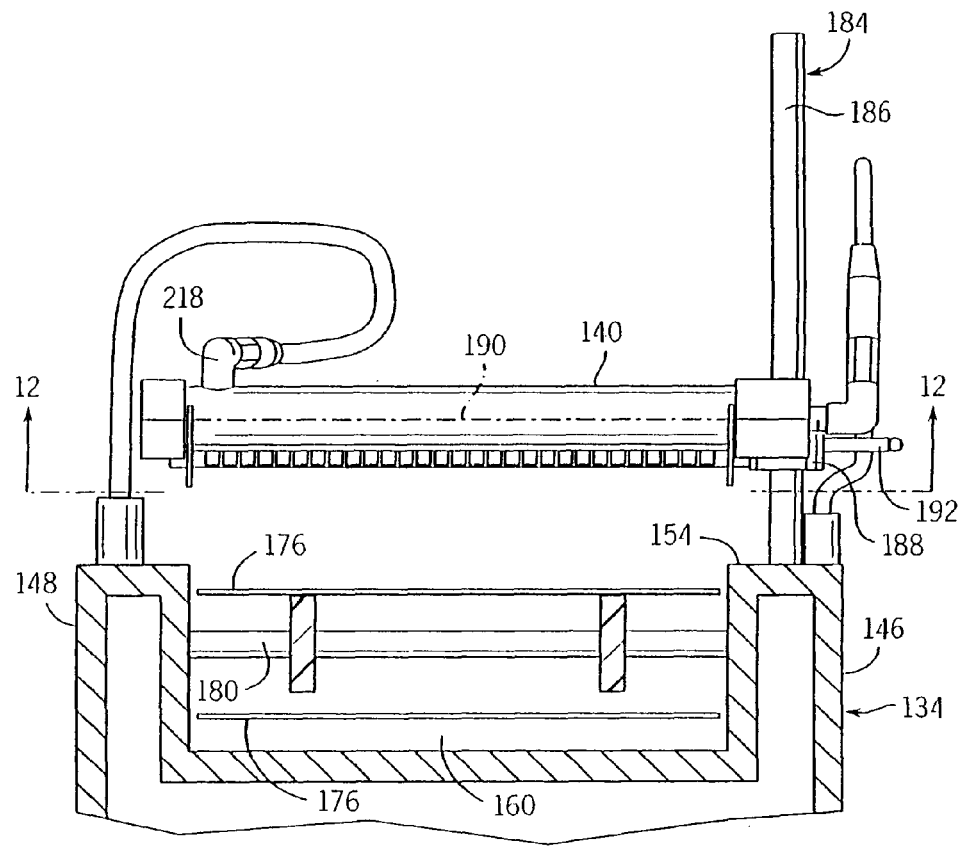
FIG. 11 is side plan view of a portion of the injection apparatus shown in FIGS. 8 through 10, showing a channel and a conveyor system mounted within the channel.

Best shown in FIG. 11, the conveyor system 138 is mounted within the channel 160 in order to move injection subjects through the apparatus 130, from the right end 150, past the injection head 140, to the left end 152 of the injection apparatus 130. The conveyor system 138 includes a conveyor belt 176 having a plurality of apertures 178 (best shown in FIG. 9) formed therein so that excess injection fluid can pass through the conveyor belt 176 to the channel 160. Further, the apertures 178 allow a subject to be injected by an injection head 140 positioned at a point below the conveyor belt 176.

Figure 16:
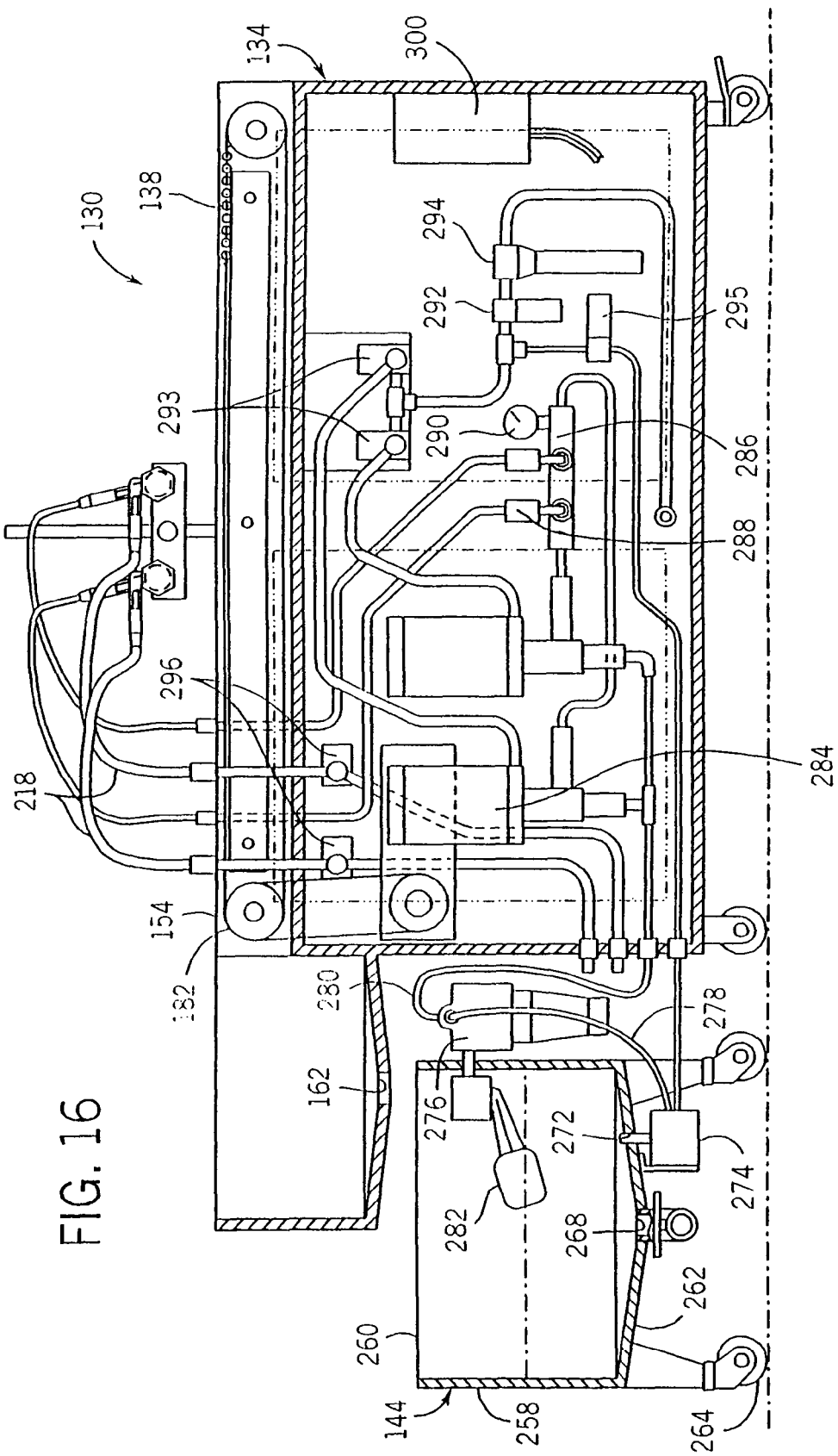
FIG. 16 is a plan view of the injection apparatus shown in FIG. 8, showing a back side thereof with doors removed.

The conveyor system 138 is mounted to the cabinet 134 using a support structure 180 and drive mechanism 182 (shown in FIG. 16). While FIG. 11 illustrates the conveyor system 138 mounted within the channel 160, the conveyor system 138 can be mounted on top of or onto the cabinet 134 in any manner known to those skilled in the art that permits movement of the injection subject past the injection heads 140. In addition, the conveyor system 138 may contain a sensor, such as an optical sensor, for sensing the location of the injection subjects along the conveyor belt 176. These sensors can be remotely linked to a controller or computer to indicate when the subjects are in position to be injected or in position to be off-loaded from the conveyor belt 176.

The injection heads 140 are affixed to the top 154 of the cabinet 134 by a mounting system 184. The mounting system 184 includes a mounting post 186 and a bracket 188 which movably support each injection head 140, permitting the injection head 140 to be raised or lowered to any vertical position along the mounting post 186, including below the conveyor belt 176. Preferably, the injection heads are positioned to be no more than two inches from the injection subject; however, any injection height may be used.

The mounting system 184 further permits each injection head 140 to be rotated about its center axis 190, allowing the angle of the injection bursts to be varied. In addition, the mounting system 184 can be provided with set-screws 192 or other adjustment mechanism for further elevating the height of the injection head 140.

Alternatively, the injection heads 140 may be mounted to the cabinet 134 in any location or in any manner that allows each injection head 140 to be moved about three orthogonal axes, including electronically automated mounting systems that are controllable via a remote controller or computer. In addition, while two injection heads 140 are shown, it will be appreciated that a single injection head 140 or more than two injection heads 140 may be required for a given injection application.

Figure 12:
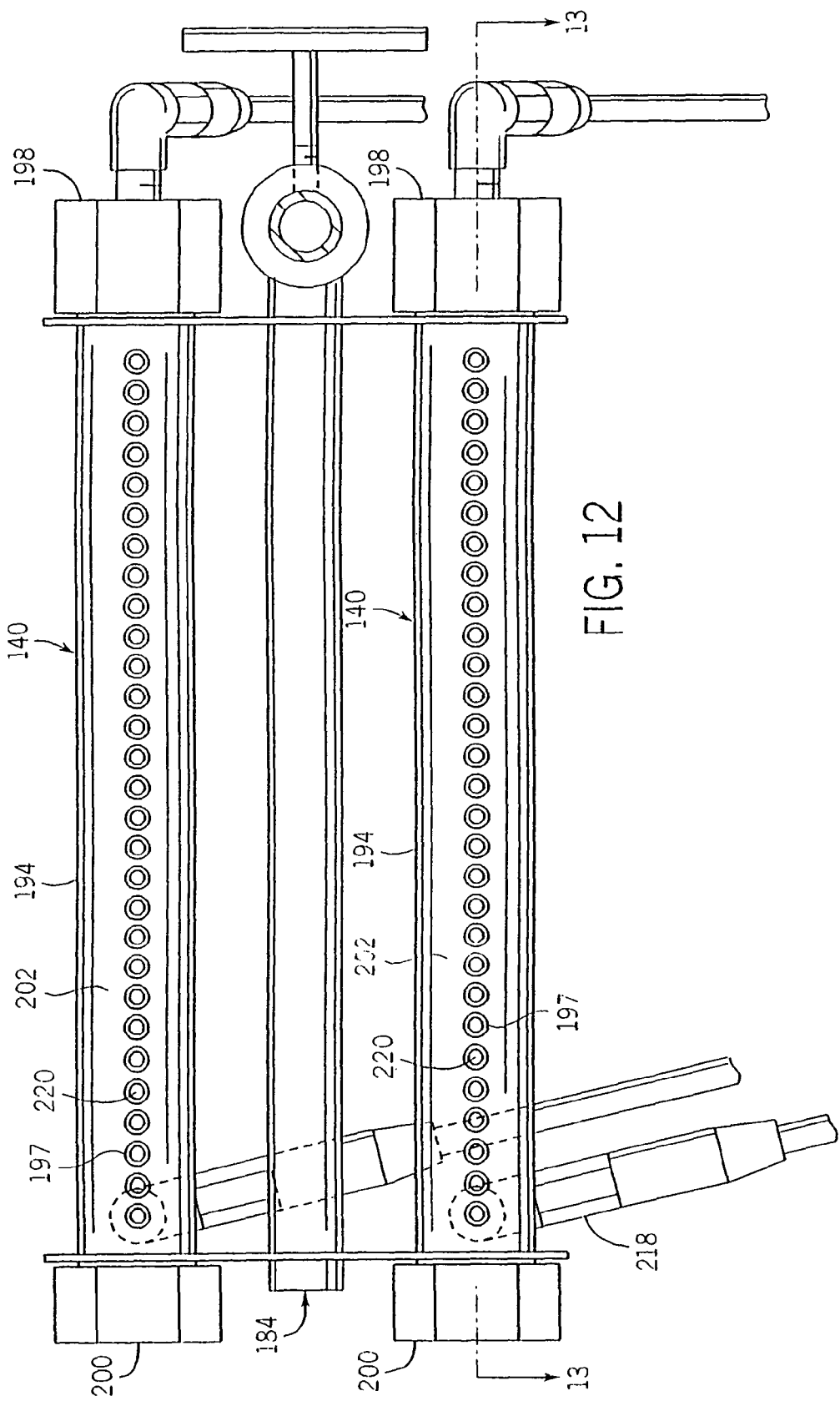
FIG. 12 is a bottom plan view of an injection head of the injection apparatus shown in FIG. 11 taken along line 12-12.

Referring next to FIGS. 12 and 13, a detailed view of the injection head 140 is shown. The injection head 140 includes a hollow, tubular member 194, a plurality of injection nozzles 196 and end caps 198, 200. The injection head and related components are preferably constructed of stainless steel; however, the injection head may be constructed of any material known to those skilled in the art capable of withstanding the high system pressures required to needlelessly inject subjects.

As illustrated in FIG. 13, the tubular member 194 has cylindrical, outer surface 202, a top portion indicated generally at 204, a bottom portion indicated generally at 206 and opposing open ends 208 and 210. The open ends 208, 210 of the tubular member 194 include threads 212 for removably attaching the end caps 198, 200 to the tubular member 194. The tubular member 194 further includes injection apertures 214 disposed along the bottom portion 206. When the nozzles 196 are removed from the tubular member 194, the injection apertures 214 and the open ends 208, 210 in the tubular member 194 can be used as cleaning apertures when cleaning of the apparatus 130 is required. Alternatively, cleaning of the nozzles 196 and the injection head 140 can occur with the nozzles 196 in place on the manifold.

The tubular member 194 further includes an escape aperture 216 disposed on its top portion 204 of near the end 210. The escape aperture 216 is used as an air bleed/pressure relief port to prevent build-up of air within the injection head 140 during operation of the apparatus 130; thus, the escape aperture 216 is preferably at the point of highest elevation along the injection head 140. A quick-connect fluid line 218 is attached to escape aperture 216 to evacuate air build-up in the injection head 140 during operation.

Best shown in FIG. 13, the injection nozzles 196 are removably attached to each of the injection apertures 214 by a retaining screw 197. While the nozzles 194 are shown secured into the injection apertures 214 using a retaining screw, the nozzles 196 may be integral to the injection head 140 or otherwise removable attached to the injection apertures 214 in any manner known to those skilled in the art.

Referring again to FIG. 12, each injection nozzle 196 has an orifice 220 for delivery of the injection fluid to the subject. The orifice 220 in each injection nozzle 196 is preferably less than 0.025 inches and more preferably approximately 0.006 inches. The nozzles 196 and set screw 197 are removable for cleaning and can be easily changed depending on the subject to be injected and the desired injection objectives. In addition, consistent with the teachings of the present invention, it will be apparent to one skilled in the art that the orifice 220 in the injection nozzles 196 may be greater than 0.025 inches depending on the type and/or the thickness of the subject to be injected.

The nozzles 196 are constructed of sapphire, or any material known to those skilled in the art capable of withstanding the high-pressure fluid bursts required for the needleless injection of subjects.

FIG. 14 illustrates the fluid-in end cap 198 which is used to removably seal the open end 208 of the tubular member 194 closed. The end cap 198 includes a feed port 222 having a threaded inlet 224 and a threaded outlet 226 through which the injectate fluid pumped to the injection head 140 is first received. The threaded inlet 224 is sized to receive a fluid feed connection. The threaded outlet 226 is sized to receive open end 208.

In addition, the end cap 198 includes a small compartment 228 bored into the feed port 222, adjacent to the threaded outlet 226. The end cap 198 further includes an O-ring 230 (shown in FIG. 15) positioned within the threaded outlet 226 to ensure a tight seal between the end 208 of the tubular member 194 and the end cap 198.

Likewise, an end cap 200, shown in FIGS. 12 and 13, is used to removably seal the open end 210 of the tubular member 194 closed. The end cap 200 includes a threaded cavity 232 in the center of the end cap 200 and is sized to receive the end 210 of the tubular member 194. Further, the end cap 200 includes an O-ring 234 to ensure a tight seal between the end 210 of the tubular member 194 and the end cap 200.

The ends 208, 210 of the tubular member 194 are sealed for a production run by threading and hand tightening end caps 198, 200 onto the tubular member 194 so that the peripheral edge of each end 208, 210 abuts or contacts the O-rings 230, 234, as shown in FIG. 13. Accordingly, during a production run, the incoming fluid does not contact any threading, grooves or pitting that may be present in either the end caps 198, 200 or the ends 208, 210, thereby making cleaning easier to perform.

Further, because residual injection fluid does not become trapped within the threading or pass through it, the risk for fluid contamination is decreased. In addition, the configuration of the injection head 140 may increase the useful life of the injection head 140, as threads or grooves exposed to acidic conditions (cleaning fluid or injectate) tend to pit easily and rust.

The O-rings 230, 234 can be constructed of a material such as those sold under the trademark TEFLON by DuPont, Inc. or its licensees, EPDM (Ethylene Propylene Diene Monomer), silicone, rubber, or any other material appropriate for the particular application and known to those skilled in the art that can seal the ends 208, 210 of the tubular member 194 closed.

Referring back to FIG. 13, a first filter 236 is shown. The filter 236 is generally a hollow tube having a cylindrical exterior surface 238 and opposing ends 240 and 242. The end 240 is open to channel the fluid entering through the feed port 222 in the end cap 198 directly into the filter 236 when it is installed within the injection head 140. The length and width of the filter 236 are selected to permit the filter 236 to fit within the injection head 140.

The filter 236 includes apertures 244 formed in the surface 238 along the length of the filter 236. The apertures 244 can be located anywhere along the longitudinal or circumferential extent of the filter 236. The number and placement of the apertures 244 in filter 236 is dependent on the flow volume required for a given injection run, which is in turn also affected by the number of injection nozzles used, the type of injectate fluid used, the required injection time, the required burst pressure or a combination thereof.

The filter 236 further includes an O-ring 246 near the end 240 for removably sealing the filter 236 relative to the feed port 222 when the filter 236 is installed within the injection head 140.

Typically, the filter 236 is installed into the injection head 140 with the end cap 200 already in place over the open end 210 of the tubular member 194. The end 242 of the filter 236 is inserted into the tubular member 194 and is positioned such that it rests on and is maintained within the cavity 232 in the center of the end cap 200, as shown in FIG. 13. When the end cap 198 is installed on the end 208 of the tubular member 194, the end 240 of the filter 236 rests and is maintained within the small compartment 228 over feed port 222. The O-ring 246 in the end 240 of the filter 236 threadlessly seals the injectate filter 236 in place.

The filter 236 can, alternatively, be installed into the injection head 140 before the end caps 198, 200 are installed on the injection head 140 with the end caps 198, 200 being positioned on to the injection head 140 after the filter 236 has been placed inside.

The injectate filter 236 prevents nozzle plugging without being integral to the fluid-in end cap and without requiring a steel mesh encasing or another filter-type material affixed to the filter 236. Further, the filter 236 is a stand-alone filter that rests within the injection head 140, allowing easy change-out of the filter 236 during breaks in a continuous operation or during cleaning.

In addition, the filter 236, by virtue of the O-ring 246 seal, reduces the risk of contamination of the injectate fluid and the needleless injection apparatus 130 by preventing the fluid from contacting any threading present in the filter 236, the end caps 198, 200, or the tubular member 194. The filter 236 may also increase the useful life of the injection head 140 and/or the end caps 198, 200 over other filter configurations, as threads or grooves exposed to acidic conditions (cleaning fluid or injectate) tend to pit easily and rust.

Referring next to FIG. 13, there is shown a second, alternate filter 248 for the needleless injection apparatus 130 of the present invention. The filter 248 is generally a disk-shaped element having a front side 250 and a back side 252. The filter 248 includes a flat, peripheral edge 254 and a plurality of apertures 256 formed within the filter 248.

To install the filter 248 into the injection head 140, the back side 252 of the filter 248 is placed into the end cap 198, without O-ring 230 present within the end cap 198, such that the feed port 222 is covered by the filter 248. The O-ring 230 is then placed over the disk filter 248 so that the O-ring 230 engages the filter's peripheral edge 254. The end cap 198 is then threaded onto the end 208 of the tubular member 194, thereby threadlessly sealing the filter 248 in place within the injection head 140. During operation, injectate fluid passes through the apertures 256 in the filter 248 to remove particulate in the injection fluid.

It will appreciated by those skilled in the art that the injection head 140 may be of any shape or size, provided that adequate fluid pressure can be achieved at the outlet of the nozzles 196 to provide for the needleless injection of the subject. For example, the injection head 140, rather than being tubular in shape, can be round or generally cylindrical in shape having apertures within any surface of the cylinder. In addition, the injection head 140 can have injection nozzles that are formed integrally therein, rather than including a tubular member with apertures for removable nozzles. Therefore, the injection head can be a single piece component, lending itself to easier cleaning and assembly.

Further, the injection head 140 may contain apertures 214 and/or nozzles 196 configured in any pattern desirable for a given injection application. For example, the nozzles may be concentrated in a circular pattern or a rectangular pattern, depending on the type of injection subject.

Turning next to FIG. 16, the primary reservoir 144 is a generally rectangular container having four sides 258, an open top 260 and a bottom 262 supported by casters 264. The bottom 262 of the primary fluid reservoir 144 is sloped downward to the center 266 of the bottom 262 such that the center 266 is the lowest point in the bottom 262 of the reservoir 144. Accordingly, any particulate matter present in the injectate fluid will accumulate at the center 266 of the bottom 262. A cleaning aperture 268 is formed within the center 266 of the bottom 262 of the reservoir 144. Further, a cleaning valve 270 is attached to the cleaning aperture 268 to facilitate draining and cleaning of the reservoir 144.

A fluid-feed aperture 272 is formed within the sloped bottom 262 of the primary fluid reservoir 144 at a point higher up along the bottom 262 than the center 266 to minimize the introduction of unwanted particulate into the system. A fluid-feed air pump 274 is attached to the fluid-feed aperture 272. The air pump 274 draws fluid from the primary reservoir 144 and pumps the fluid to a main injectate filter 276 via a fluid line 278.

The fluid leaving the main injectate filter 276 enters the cabinet 134 via a fluid line 280, ultimately feeding the injection head 140. The main injectate filter 276 may be mounted to the reservoir 144, to the cabinet 134, may be free standing or may be mounted to the apparatus 130 in any way known to those skilled in the art. Further, there may be more than one main injectate filter, as described above, that permits filter change-out during continuous operation of the injection apparatus 130. For added food safety and to prevent clogging, additional fluid filters can be positioned anywhere within the fluid path of the apparatus 130.

The primary fluid reservoir 144 further contains a float valve 282 for replenishing the volume of injectate fluid within the reservoir 144. The float valve 282 may automatically open to refresh the injectate supply within the primary fluid reservoir 144 via another injectate source or a secondary reservoir when the fluid level within the primary fluid reservoir 144 reaches a specified level. Alternatively, the float valve 282 may be combined with a level sensor that will indicate via the control panel 142 that the level of fluid in the primary fluid reservoir 144 is low, permitting an operator to replenish the fluid remotely via the control panel 142.

Further, while both the primary fluid reservoir 144 and the cabinet 134 are shown generally rectangular in shape, it is apparent that the shape of either the primary fluid reservoir 144 or the cabinet 134 or both can be cylindrical or any geometrical shape.

FIG. 16 further illustrates the back 148 of the cabinet 134 showing the doors 164 open. As can be seen, the fluid line 280 feeds two high-pressure air pumps 284 mounted within the cabinet 134. In turn, the air pumps 284 feed injectate to a high-pressure manifold system 286 which includes multiple fast-acting, electronically actuated solenoid valves 288. A pressure sensor 290 for monitoring the pressure output of each air pump 284 is also located within the manifold system 286.

The solenoid valves 288 are used to control the timing and duration of injection bursts and evenly distribute the injectate fluid between the injection heads 140. It will be appreciated by those skilled in the art that the number or air pumps 284 and the number of solenoid valves 288 will vary depending on the number of injection heads 140 used in the machine. Further, the need to ensure a steady stream of fluid to the injection subject without experiencing a pressure drop or supply hesitation during an injection burst also will dictate the number of air pumps used in the machine.

Further shown in FIG. 16, an air pressure regulator 292 and a filter assembly 294 are mounted within the cabinet 134 for regulating the compressed air supply used to operate the air pumps 284. The pressure regulator 292 permits an operator to adjust the pressure of the air going to the air pumps 284 thereby influencing the outlet fluid pressure from the air pumps 284. In addition, the valves 293 control the air flow to the pumps 284. In addition, a second air pressure regulator 295 is included within the cabinet 134 for regulating the air pressure supply to the external pump 274, or any additional external equipment requiring compressed air.

Pressure regulator 292 may be electronically actuated and linked with the pressure sensor 290, allowing an operator to automatically adjust the injection burst pressure via the control panel 142, or recall a saved program which automatically adjusts the regulator 292 for a given injection subject or at a given output pressure. Further, the air pressure regulator 292 allows an operator to correct both an unsteady injection stream or variations in compressed air supply pressure while the machine is running. In addition, pressure sensor 290 and pressure regulator 292 can be used to automatically adjust the air pressure. In this instance, the required air pressure will be maintained and controlled automatically via the controller, requiring no operator intervention.

FIG. 16 further shows how the fluid lines 218 from each escape aperture 216 of the injection head 140 enter the cabinet 134. As can be seen, a fast-acting solenoid valve 296 is connected to each line 218 for quickly releasing any air build-up in the injection head 140 during operation. Since injection fluid may also be released through the escape aperture 216, fluid exiting the valves 296 may be piped to a drain or recycled back into the primary reservoir 144 or another injectate source. Importantly, the valves 296 are not located within each escape aperture 216; rather, the valves 296 are located within the cabinet 134 at the end of fluid lines 218, thereby eliminating exposure of the valves to a damp working environment. Also, the valves 296 can be automated and programmed to open at predetermined intervals for a given injection subject without requiring an affirmative action by the operator, simplifying operation of the injection apparatus 130.

The conveyor drive mechanism 182 is positioned within the cabinet 134 along with any components of the conveyor support structure 180 necessary for using the conveyor system 138.

Referring back to FIG. 8 for the moment, the control panel 142 is shown attached to the cabinet 134. The control panel 142 includes a sealed touch screen 298 which is linked to a programmable logic controller (PLC) 300 within the cabinet 134 (shown in FIG. 16) for storing and controlling operational information. A button 302 is also included on the control panel 142. The button 302 is rotated in the clockwise direction to turn the machine on. The button 302 is also an emergency stop button that instantly stops the machine when depressed. Also, when a production run is over, the button 302 will be depressed to stop the machine.

The PLC 300 may control all process variables including complete synchronization of the conveyor system 138 with the injection bursts to be delivered to the subject. This can include automatic control of the injection pressure, duration of the bursts, spacing between injection bursts and timing of the injections. Further, every valve used in the injection apparatus 130 may be automated using the PLC 300. Variables such as the air pressure supplied to the air pumps 284, the output pressure of the air pumps 284, the direction of injection spray, the orientation of the injection heads 140 or the fluid level in the reservoir 144 may be monitored and controlled by the PLC 300, thereby simplifying both operation of the machine and integration of the machine into a continuous production line. While a programmable logic controller is disclosed, one skilled in the art will appreciate that any computer control device may be used to store injection and process variables and/or operate the machine.

It can be seen that the present invention includes a method of using a substantially uniform, high-pressure injection burst to needlelessly inject a subject with injectate fluid. In this way, damage to the external surfaces of the subject is minimized. The present invention also includes a method of delivering injection fluid to a subject using substantially uniform, high-pressure injection bursts of a sufficient pressure to needlelessly add flavor, color, preservatives, binders, antimicrobial solutions and/or tenderize an injection subject without significant damage to the external surfaces of the injection subject.

Accordingly, referring to FIGS. 8 through 16, operation of the needleless injection apparatus 130 of the present invention will now be described. First, an operator uses the touch screen 298 to retrieve from the PLC 300 a stored set of process variables for a given injection subject or for a given injection effect. The preprogrammed process variables can include control of the injection pressure, duration of the injection bursts, spacing between injection bursts, timing of the injections, the output pressure of the air pumps 284, the direction of injection spray, the orientation of the injection heads 140, the number of injection subjects or any other information necessary to inject a given type of subject. If no predetermined program exists for the production run, an operator may enter variables via the touch screen 298 and/or adjust the variables during the production run in accordance with the required injection effect to be achieved by the machine.

The reservoir 144 is filled with the desired injection fluid. In addition, if a secondary reservoir is used, the secondary reservoir must be also filled with injection fluid. When the primary reservoir reaches a low level, the controller may be programmed to automatically replenish the primary reservoir from the secondary reservoir. Accordingly, no operator intervention will be required to maintain a high level of fluid within the primary reservoir.

Alternatively, if the primary reservoir 144 becomes low, the touch screen 298 may indicate to the operator that the level is low and will permit the operator to refresh the injectate fluid automatically using the controller. In addition, the operator can pause the operation of injection apparatus 130 and manually refill the primary reservoir 144.

During operation, injection fluid will be pumped from the reservoir 144 through the fluid feed aperture 272 to the main injectate filter 276 by the feed pump 274. The fluid then flows from the main injectate filter 276 to the low-pressure side of the injection air pumps 272 within the cabinet 134. The air pumps 284 pump the fluid to the injection manifold system 286. At this time, the output pressure of the fluid is measured by the sensor 290 to determine if the required injection pressure has been attained. If not, the program automatically adjusts the air pressure to the pumps 284 using the air pressure regulator 292, or the operator may adjust the regulator 292 via the touch screen 286. The fluid is evenly distributed among the injection heads 140 by the injection manifold 286 which directs fluid to the high-pressure solenoid valves 288, ensuring that each injection head 140 receives an adequate and substantially equal flow of fluid.

Injection subjects are placed on the conveyor belt 176 near end 150 either manually by an operator, or preferably, automatically by another conveyor system or machine in the production line. The injection subject is moved towards the injection heads 140 and is injected according to the desired results. When the subject is in place, solenoid valves 288 in the manifold system 286 open allowing fluid to be delivered to the subject through the nozzles 196 on each injection head 140. After an injection burst is complete, the valves 288 are closed.

Periodically, the fast-acting solenoid valves 296 connected to the escape apertures 216 are opened to relieve any air build-up within the injection heads 140. If the valves 296 are not programmed to open at a given interval, the operator can use the touch screen 298 to cause the valves 296 to open periodically.

Subjects can be injected in place, with the conveyor belt 176 stopped, or the subjects can be injected while the conveyor belt 176 is moving relative to the injection heads 140, depending on the desired results.

Excess injection fluid flows into the channel 160 and then into the catch basin 136. If recycling of the injection fluid is desired, the catch basin may drain directly back into the primary reservoir 144 or into a reserve reservoir. Alternatively, the excess injection fluid may be piped directly to a drain.

After injection, the injection subjects may be off-loaded automatically from the conveyor belt 176 for further processing and/or packaging. However, off-loading of subjects can be performed manually.

We claim:

1. A machine for injecting liquids comprising:
   at least one manifold head, adapted to receive high-pressure injection fluid, including a fluid entry port and a plurality of injection nozzles, each of said injection nozzles having an injection orifice, said manifold head comprising an escape aperture; and
   at least one filter assembly comprising a liquid inlet, a liquid outlet, and a liquid passageway connecting said liquid inlet and liquid outlet, said filter assembly in direct, non-threaded contact with said fluid feed port of said manifold head.

2. A machine for injecting liquids as defined in claim 1, wherein said injection orifice has an interior diameter of less than 0.025 inches.

3. A machine for injecting liquids as defined in claim 2, wherein said injection orifice has an interior diameter of 0.006 inches.

4. A machine for injecting liquids as defined in claim 1, further comprising:
   at least one air pump having a low pressure inlet and a high-pressure outlet in fluid communication with said fluid entry port of said manifold head.

5. A machine for injecting liquids as defined in claim 4, further comprising:
   a manifold system having an inlet connected to said high-pressure outlet of said air pump, a plurality of valves connected to said inlet of said manifold system adapted to receive high-pressure injection fluid from said pump, and at least one outlet in fluid communication with said fluid feed port of said manifold head.

6. A machine for injecting liquids as defined in claim 1, further comprising:
   at least one valve in fluid communication with said escape aperture of said manifold head.

7. A machine for injecting liquids as defined in claim 5, wherein said valve is a fast-acting solenoid valve.

8. A machine for injecting liquids as defined in claim 1, further comprising:
   a fluid source in fluid communication with said manifold head.

9. A machine for injecting liquids according to claim 1 wherein said at least one injection head is movably mounted to allow for varied angles of injection bursts into a subject.

10. A machine for injecting liquids comprising:
    at least one manifold head, adapted to receive high-pressure injection fluid, including a fluid entry port and a plurality of injection nozzles, each of said injection nozzles having an injection orifice, said manifold head comprising an escape aperture; and
    at least one filter assembly comprising a liquid inlet, a liquid outlet, and a liquid passageway connecting said liquid inlet and liquid outlet, said filter assembly in non-threaded engagement with said fluid feed port of said manifold head.

11. A machine for injecting liquids as defined in claim 10, comprising:
    at least one valve in fluid communication with said escape aperture of said manifold head.

12. A machine for injecting liquids as defined in claim 10, comprising:
    at least one air pump having a low pressure inlet and a high-pressure outlet in fluid communication with said fluid entry port of said manifold head.

13. A machine for injecting liquids as defined in claim 12, further comprising:
    a manifold system having an inlet connected to said high-pressure outlet of said air pump, a plurality of valves connected to said inlet of said manifold system adapted to receive high-pressure injection fluid from said pump, and at least one outlet in fluid communication with said fluid feed port of said manifold head.

14. A machine for injecting liquids as defined in claim 13, wherein said valve is a fast-acting solenoid valve.

15. A machine for injecting liquids according to claim 10 wherein said at least one injection head is movably mounted to allow for varied angles of injection bursts into a subject.

* * * * *